(12) United States Patent
Tu

(10) Patent No.: US 10,033,432 B2
(45) Date of Patent: Jul. 24, 2018

(54) METHOD, DEVICE, AND SYSTEM FOR CANCELING CROSSTALK BETWEEN LINES IN DSL SYSTEM

(71) Applicant: Huawei Technologies Co., Ltd., Shenzhen (CN)

(72) Inventor: Jianping Tu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 106 days.

(21) Appl. No.: 15/337,688

(22) Filed: Oct. 28, 2016

(65) Prior Publication Data
US 2017/0047967 A1 Feb. 16, 2017

Related U.S. Application Data

(63) Continuation of application No. PCT/CN2014/076638, filed on Apr. 30, 2014.

(51) Int. Cl.
*H04B 3/32* (2006.01)
*H04L 5/00* (2006.01)

(52) U.S. Cl.
CPC ............. *H04B 3/32* (2013.01); *H04L 5/0048* (2013.01)

(58) Field of Classification Search
CPC .............................. H04B 3/32; H04L 5/0048
See application file for complete search history.

(56) References Cited

U.S. PATENT DOCUMENTS 6,236,645 B1   5/2001 Agazzi
7,394,752 B2   7/2008 Hasegawa et al.
(Continued)

FOREIGN PATENT DOCUMENTS

CN   101536271 A   9/2009
CN   101777961 A   7/2010
(Continued)

OTHER PUBLICATIONS

"Series G: Transmission Systems and Media, Digital Systems and Networks, Digital Sections and digital line systems—Metallic access networks, Self-FEXT cancellation (vectoring) for use with VDSL2 transceivers, Amendment 5: Exchange of transceiver IDs during initialization," ITU-T, Apr. 2014, 10 pages.

(Continued)

*Primary Examiner* — Andrew Lai
*Assistant Examiner* — Harry H Kim
(74) *Attorney, Agent, or Firm* — Conley Rose, P.C.

(57) ABSTRACT

A method for canceling crosstalk between lines in a DSL system is presented. The method includes obtaining an upstream signal that is sent by corresponding customer premises equipment (CPE) and that is received by each central office (CO), forming an upstream signal sequence including upstream signals of all COs, obtaining a downstream signal that is sent by each CO to the CPE corresponding to each CO, and forming a downstream signal sequence including downstream signals of all the COs; performing FEXT cancellation processing on the upstream signal sequence to obtain a first signal sequence, and processing the downstream signal sequence to determine NEXT signals in the upstream signals of all the COs; and performing NEXT cancellation processing on the first signal sequence using the determined NEXT signals, to obtain a second signal sequence, and sending upstream signals in the second signal sequence to all the COs.

20 Claims, 5 Drawing Sheets

(56) References Cited

U.S. PATENT DOCUMENTS

| | | | | |
|---|---|---|---|---|
| 9,001,880 B2* | 4/2015 | Herrmann | ............... | H04B 3/32 |
| | | | | 375/229 |
| 2003/0086362 A1* | 5/2003 | Hasegawa | ............... | H04B 3/32 |
| | | | | 370/201 |
| 2013/0215935 A1* | 8/2013 | Nuzman | ................ | H04B 3/32 |
| | | | | 375/219 |

FOREIGN PATENT DOCUMENTS

| | | | |
|---|---|---|---|
| CN | 102224717 A | 10/2011 | |
| CN | 102859974 A | 1/2013 | |
| CN | 102859984 A | 1/2013 | |

OTHER PUBLICATIONS

Foreign Communication From a Counterpart Application, Chinese Application No., 201480000778.0, Chinese Office Action dated Nov. 2, 2016, 5 pages.

Foreign Communication From a Counterpart Application, European Application No. 14890829.6, Extended European Search Report dated Jan. 1, 2017, 7 pages.

Foreign Communication From a Counterpart Application, PCT Application No. PCT/CN2014/076638, English Translation of International Search Report dated Feb. 6, 2015, 2 pages.

Foreign Communication From a Counterpart Application, PCT Application No. PCT/CN2014/076638, English Translation of Written Opinion dated Feb. 6, 2015, 4 pages.

\* cited by examiner

METHOD, DEVICE, AND SYSTEM FOR CANCELING CROSSTALK BETWEEN LINES IN DSL SYSTEM

CROSS-REFERENCE TO RELATED APPLICATIONS

This application is a continuation of International Application No. PCT/CN2014/076638, filed on Apr. 30, 2014, which is hereby incorporated by reference in its entirety.

TECHNICAL FIELD

The present disclosure relates to the field of communications technologies, and in particular, to a method, a device, and a system for canceling crosstalk between lines in a digital subscriber line (DSL) system.

BACKGROUND

Various types of DSLs are collectively referred to as xDSLs, and xDSLs are a high-rate data transmission technology for transmission over a telephone twisted pair (that is, unshielded twisted pair (UTP). In addition to DSLs for baseband transmission such as an Integrated Services Digital Network DSL (IDSL) and a symmetrical high-speed DSL (SHDSL), xDSLs further include xDSLs for passband transmission. For an xDSL for passband transmission, a frequency division multiplexing technology is used to enable the xDSL and a plain old telephone service (POTS) to coexist over a same twisted pair, where the xDSL occupies a high frequency band, and the POTS occupies a baseband lower than 4 kilohertz (kHz). A POTS signal and an xDSL signal are separated by a splitter. Discrete multitone (DMT) modulation is used for the xDSL for passband transmission. A system that provides multiple xDSL connections is referred to as a DSL access multiplexer (DSLAM), and a system model of the DSL access multiplexer is shown in FIG. 1.

As an access node (AN), a DSLAM device can access multiple customer premises equipment (CPE), and on an AN side, there are multiple central offices (CO) in a one-to-one correspondence to the CPEs. Because of the principle of electromagnetic induction, multiple signals received by the DSLAM interfere with each other, which is referred to as crosstalk. Crosstalk between multiple signals includes near-end crosstalk (NEXT) and far-end crosstalk (FEXT). A process of forming the NEXT is shown in FIG. 2, where a downstream data stream sent by a CO1 to CPE 1 generates NEXT to a CO2 adjacent to the CO1, and an upstream data stream sent by the CPE1 to the CO1 also generates NEXT to the CPE2. A process of forming the FEXT is shown in FIG. 3, where a downstream data stream sent by a CO1 to CPE 1 generates FEXT to CPE 2 adjacent to the CPE1, and an upstream data stream sent by the CPE1 to the CO1 also generates FEXT to the CO2.

Energy of both NEXT and FEXT increases as a frequency band becomes higher. As shown in FIG. 4, in all existing xDSL technologies, such as asymmetric DSL (ADSL), ADSL2, ADSL2+, Very-high-bit-rate DSL (VDSL), and VDSL2, a frequency division duplex (FDD) technology is used on upstream and downstream channels, and in this case, impact of NEXT on system performance may be omitted and major impact comes from FEXT. However, as a frequency band used for an xDSL becomes increasingly wider, FEXT impacts transmission performance of the VDSL2 increasingly seriously. Currently, the International Telecommunication Union Telecommunication Standardization Sector (ITU-T) has formulated a G993.5 standard to perform joint receiving and sending at a CO end using a vectoring technology, to cancel a FEXT signal.

DSL frequency spectrum resources are limited, and attenuation becomes larger as a line is longer; therefore, extension of frequency spectrum resources cannot improve performance. To resolve the foregoing problem, communications technologies of intra-frequency duplex such as a synchronized symmetric DSL (SSDSL) and trellis-coded modulation (TCM) in Japan are proposed. In an overlapped spectrum duplex (OSD) system, because upstream/downstream frequency spectrums overlap, NEXT is generated, as shown in FIG. 5. Because a very low frequency is used in the intra-frequency duplex technology and the frequency is usually below 1.104 megahertz (MHz), NEXT is not very serious. When a frequency band used becomes wider, impact from NEXT becomes increasingly serious, and performance cannot be further ensured.

In conclusion, although the Vectoring technology in the existing G.993.5 standard cancels FEXT, but the vectoring technology cannot resolve a problem of NEXT existing in an OSD system, which reduces performance of the OSD system. To reduce impact of NEXT, NEXT and FEXT need to be canceled in a joint cancellation manner.

SUMMARY

Embodiments of the present disclosure provide a method, a device, and a system for canceling crosstalk between lines in a digital subscriber line DSL system, to provide a processing solution for simultaneously canceling an NEXT signal and an FEXT signal in each upstream signal, which improves a processing speed and reduces a processing delay.

According to a first aspect, a method for canceling crosstalk between lines in a DSL system is provided, where the DSL system includes multiple DSL lines and each DSL line is connected to one CO and one CPE, and the method includes obtaining an upstream signal that is sent by CPE corresponding to each CO and that is received by the CO, forming an upstream signal sequence including upstream signals of all COs, obtaining a downstream signal that is sent by each CO to the CPE corresponding to each CO, and forming a downstream signal sequence including downstream signals of all the COs; performing FEXT cancellation processing on the upstream signal sequence using an FEXT cancellation coefficient sequence formed by FEXT cancellation coefficients that are used to cancel FEXT signals in the upstream signals of all the COs, to obtain a first signal sequence, and processing the downstream signal sequence using a preconfigured joint upstream cancellation coefficient sequence, to determine NEXT signals in the upstream signals of all the COs; and performing NEXT cancellation processing on the first signal sequence using the determined NEXT signals, to obtain a second signal sequence, and sending upstream signals in the second signal sequence to all the COs.

With reference to the first aspect, in a first possible implementation manner, the obtaining an upstream signal that is sent by CPE corresponding to each CO and that is received by the CO, forming an upstream signal sequence including upstream signals of all COs includes receiving an upstream signal that is forwarded by each CO and that includes no Echo interfering signal, and forming an upstream signal sequence including upstream signals that are of all the COs and that include no Echo interfering signal, where after each CO receives an upstream signal sent by the CPE corresponding to each CO, each CO performs Echo interference cancellation processing on the received upstream signal, to obtain an upstream signal including no Echo interfering signal.

With reference to the first possible implementation manner of the first aspect, in a second possible implementation manner, the processing the downstream signal sequence using a preconfigured joint upstream cancellation coefficient sequence, to determine NEXT signals in the upstream signals of all the COs includes performing precoding processing on the downstream signal sequence according to a precoding coefficient sequence formed by precoding coefficients of the downstream signals of all the COs, to obtain a downstream precoding signal sequence corresponding to the downstream signal sequence; and processing the downstream precoding signal sequence using a first joint upstream cancellation coefficient sequence, to determine the NEXT signals in the upstream signals of all the COs, where the first joint upstream cancellation coefficient sequence is formed by combining an NEXT cancellation coefficient sequence formed by NEXT cancellation coefficients that are used to cancel the NEXT signals in the upstream signals of all the COs and the FEXT cancellation coefficient sequence formed by the FEXT cancellation coefficients that are used to cancel the FEXT signals in the upstream signals of all the COs.

With reference to the first possible implementation manner of the first aspect, in a third possible implementation manner, the processing the downstream signal sequence using a preconfigured joint upstream cancellation coefficient sequence, to determine NEXT signals in the upstream signals of all the COs includes processing the downstream signal sequence using a second joint upstream cancellation coefficient sequence, to determine the NEXT signals in the upstream signals of all the COs, where the second joint upstream cancellation coefficient sequence is formed by combining an NEXT cancellation coefficient sequence formed by NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and a precoding coefficient sequence formed by precoding coefficients that correspond to the downstream signals of all the COs.

With reference to the first aspect, in a fourth possible implementation manner, the obtaining an upstream signal that is sent by CPE corresponding to each CO and that is received by the CO, forming an upstream signal sequence including upstream signals of all COs includes receiving the upstream signal that is sent by the CPE corresponding to each CO and that is received and forwarded by the CO, and forming the upstream signal sequence including the upstream signals of all the COs; and the processing the downstream signal sequence using a preconfigured joint upstream cancellation coefficient sequence, to determine NEXT signals in the upstream signals of all the COs includes processing the downstream signal sequence using a third joint upstream cancellation coefficient sequence, to determine the NEXT signals and Echo interfering signals in the upstream signals of all the COs, where the third joint upstream cancellation coefficient sequence is formed by combining an Echo cancellation coefficient sequence formed by Echo cancellation coefficients that are used to cancel the Echo interfering signals in the upstream signals of all the COs, an NEXT cancellation coefficient sequence formed by NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and a precoding coefficient sequence formed by precoding coefficients that correspond to the downstream signals of all the COs.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, the method further includes obtaining an upstream pilot signal that is sent by the CPE corresponding to each CO, that is received by the CO, and that is used to update a joint upstream cancellation coefficient sequence, forming a first upstream pilot signal sequence, obtaining a downstream pilot signal that is sent by each CO according to a period to the CPE corresponding to each CO and that is used to update the joint upstream cancellation coefficient sequence, and forming a downstream pilot signal sequence; performing cancellation processing on an FEXT signal in the first upstream pilot signal sequence using the FEXT cancellation coefficient sequence, to obtain a second upstream pilot signal sequence, and processing the downstream pilot signal sequence using a currently-used joint upstream cancellation coefficient sequence, to determine NEXT signals in upstream pilot signals; performing NEXT cancellation processing on the second upstream pilot signal sequence using the determined NEXT signals, to obtain a third upstream pilot signal sequence; determining a variation of the joint upstream cancellation coefficient sequence according to the third upstream pilot signal sequence and a preconfigured fourth upstream pilot signal sequence that is formed by upstream pilot signals including no interfering signal; and updating, according to the determined variation, the currently-used joint upstream cancellation coefficient sequence.

With reference to the fifth possible implementation manner of the first aspect, in a sixth possible implementation manner, the joint upstream cancellation coefficient sequence is the first joint upstream cancellation coefficient sequence that is formed by combining the NEXT cancellation coefficient sequence formed by the NEXT cancellation coefficients that are used to cancel the NEXT signals in the upstream signals of all the COs and the FEXT cancellation coefficient sequence formed by the FEXT cancellation coefficients that are used to cancel the FEXT signals in the upstream signals of all the COs; or the second joint upstream cancellation coefficient sequence that is formed by combining the NEXT cancellation coefficient sequence formed by the NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and the precoding coefficient sequence formed by the precoding coefficients that correspond to the downstream signals of all the COs; or the third joint upstream cancellation coefficient sequence that is formed by combining the Echo cancellation coefficient sequence formed by the Echo cancellation coefficients that are used to cancel the Echo interfering signals in the upstream signals of all the COs, the NEXT cancellation coefficient sequence formed by the NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and the precoding coefficient sequence formed by the precoding coefficients that correspond to the downstream signals of all the COs.

According to a second aspect, a vectoring control entity (VCE) is provided, where the VCE is applied in a DSL system, the DSL system includes multiple DSL lines and each DSL line is connected to one CO and one CPE, and the VCE includes a signal obtaining module configured to obtain an upstream signal that is sent by CPE corresponding to each CO and that is received by the CO, form an upstream signal sequence including upstream signals of all COs, obtain a downstream signal that is sent by each CO to the CPE corresponding to each CO, and form a downstream signal sequence including downstream signals of all the COs; a joint cancellation module configured to perform FEXT cancellation processing on the upstream signal sequence using an FEXT cancellation coefficient sequence formed by FEXT cancellation coefficients that are used to cancel FEXT signals in the upstream signals of all the COs, to obtain a first signal sequence, and process the downstream signal sequence using a preconfigured joint upstream cancellation coefficient sequence, to determine NEXT signals in the upstream signals of all the COs; and a processing module configured to perform NEXT cancellation processing on the first signal sequence using the determined NEXT signals, to obtain a second signal sequence, and send upstream signals in the second signal sequence to all the COs.

With reference to the second aspect, in a first possible implementation manner, the signal obtaining module is configured to receive an upstream signal that is forwarded by each CO and that includes no Echo interfering signal, and form an upstream signal sequence including upstream signals that are of all the COs and that include no Echo interfering signal, where after each CO receives an upstream signal sent by the CPE corresponding to each CO, each CO performs Echo interference cancellation processing on the received upstream signal, to obtain an upstream signal including no Echo interfering signal.

With reference to the first possible implementation manner of the second aspect, in a second possible implementation manner, the processing, by the joint cancellation module, the downstream signal sequence using a preconfigured joint upstream cancellation coefficient sequence, to determine NEXT signals in the upstream signals of all the COs includes performing precoding processing on the downstream signal sequence according to a precoding coefficient sequence formed by precoding coefficients of the downstream signals of all the COs, to obtain a downstream precoding signal sequence corresponding to the downstream signal sequence; and processing the downstream precoding signal sequence using a first joint upstream cancellation coefficient sequence, to determine the NEXT signals in the upstream signals of all the COs, where the first joint upstream cancellation coefficient sequence is formed by combining an NEXT cancellation coefficient sequence formed by NEXT cancellation coefficients that are used to cancel the NEXT signals in the upstream signals of all the COs and the FEXT cancellation coefficient sequence formed by the FEXT cancellation coefficients that are used to cancel the FEXT signals in the upstream signals of all the COs.

With reference to the first possible implementation manner of the second aspect, in a third possible implementation manner, the processing, by the joint cancellation module, the downstream signal sequence using a preconfigured joint upstream cancellation coefficient sequence, to determine NEXT signals in the upstream signals of all the COs includes processing the downstream signal sequence using a second joint upstream cancellation coefficient sequence, to determine the NEXT signals in the upstream signals of all the COs, where the second joint upstream cancellation coefficient sequence is formed by combining an NEXT cancellation coefficient sequence formed by NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and a precoding coefficient sequence formed by precoding coefficients that correspond to the downstream signals of all the COs.

With reference to the second aspect, in a fourth possible implementation manner, the signal obtaining module is configured to receive the upstream signal that is sent by the CPE corresponding to each CO and that is received and forwarded by the CO, and form the upstream signal sequence including the upstream signals of all the COs; and the processing, by the joint cancellation module, the downstream signal sequence using a preconfigured joint upstream cancellation coefficient sequence, to determine NEXT signals in the upstream signals of all the COs includes processing the downstream signal sequence using a third joint upstream cancellation coefficient sequence, to determine the NEXT signals and Echo interfering signals in the upstream signals of all the COs, where the third joint upstream cancellation coefficient sequence is formed by combining an Echo cancellation coefficient sequence formed by Echo cancellation coefficients that are used to cancel the Echo interfering signals in the upstream signals of all the COs, an NEXT cancellation coefficient sequence formed by NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and a precoding coefficient sequence formed by precoding coefficients that correspond to the downstream signals of all the COs.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner, the signal obtaining module is further configured to obtain an upstream pilot signal that is sent by each CPE according to a specified period to a CO corresponding to the CPE and that is used to update a joint upstream cancellation coefficient sequence, form a first upstream pilot signal sequence, obtain a downstream pilot signal that is sent by each CO according to the period to CPE corresponding to the CO and that is used to update the joint upstream cancellation coefficient sequence, and form a downstream pilot signal sequence; the joint cancellation module is further configured to perform cancellation processing on an FEXT signal in the first upstream pilot signal sequence using the FEXT cancellation coefficient sequence, to obtain a second upstream pilot signal sequence, and process the downstream pilot signal sequence using a currently-used joint upstream cancellation coefficient sequence, to determine NEXT signals in upstream pilot signals; and the processing module is further configured to perform NEXT cancellation processing on the second upstream pilot signal sequence using the determined NEXT signals, to obtain a third upstream pilot signal sequence; determine a variation of the joint upstream cancellation coefficient sequence according to the third upstream pilot signal sequence and a preconfigured fourth upstream pilot signal sequence that is formed by upstream pilot signals including no interfering signal; and update, according to the determined variation, the currently-used joint upstream cancellation coefficient sequence.

With reference to the fifth possible implementation manner of the second aspect, in a sixth possible implementation manner, the joint upstream cancellation coefficient sequence is the first joint upstream cancellation coefficient sequence that is formed by combining the NEXT cancellation coefficient sequence formed by the NEXT cancellation coefficients that are used to cancel the NEXT signals in the upstream signals of all the COs and the FEXT cancellation coefficient sequence formed by the FEXT cancellation coefficients that are used to cancel the FEXT signals in the upstream signals of all the COs; or the second joint upstream cancellation coefficient sequence that is formed by combining the NEXT cancellation coefficient sequence formed by the NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and the precoding coefficient sequence formed by the precoding coefficients that correspond to the downstream signals of all the COs; or the third joint upstream cancellation coefficient sequence that is formed by combining the Echo cancellation coefficient sequence formed by the Echo cancellation coefficients that are used to cancel the Echo interfering signals in the upstream signals of all the COs, the NEXT cancellation coefficient sequence formed by the NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and the precoding coefficient sequence formed by the precoding coefficients that correspond to the downstream signals of all the COs.

According to a third aspect, a VCE is provided, where the VCE is applied in a DSL system, the DSL system includes multiple DSL lines and each DSL line is connected to one CO and one CPE, and the VCE includes a transceiver configured to obtain an upstream signal that is sent by CPE corresponding to each CO and that is received by the CO, form an upstream signal sequence including upstream signals of all COs, obtain a downstream signal that is sent by each CO to the CPE corresponding to each CO, and form a downstream signal sequence including downstream signals of all the COs; and simultaneously send the upstream signal sequence and the downstream signal sequence to a joint canceller; the joint canceller configured to perform FEXT cancellation processing on the upstream signal sequence using an FEXT cancellation coefficient sequence formed by FEXT cancellation coefficients that are used to cancel FEXT signals in the upstream signals of all the COs, to obtain a first signal sequence, process the downstream signal sequence using a preconfigured joint upstream cancellation coefficient sequence, to determine NEXT signals in the upstream signals of all the COs; perform NEXT cancellation processing on the first signal sequence using the determined NEXT signals, to obtain a second signal sequence; and send the second signal sequence to a transmitter; and the transmitter configured to send upstream signals in the second signal sequence to all the COs.

With reference to the third aspect, in a first possible implementation manner, the transceiver is configured to receive an upstream signal that is forwarded by each CO and that includes no Echo interfering signal, and form an upstream signal sequence including upstream signals that are of all the COs and that include no Echo interfering signal, where after each CO receives an upstream signal sent by the CPE corresponding to each CO, each CO performs Echo interference cancellation processing on the received upstream signal, to obtain an upstream signal including no Echo interfering signal.

With reference to the first possible implementation manner of the third aspect, in a second possible implementation manner, the VCE further includes an FEXT precoder configured to perform precoding processing on the downstream signal sequence according to a precoding coefficient sequence formed by precoding coefficients of the downstream signals of all the COs, to obtain a downstream precoding signal sequence corresponding to the downstream signal sequence; and send the downstream precoding signal sequence to the joint canceller, where the joint canceller is configured to process the downstream precoding signal sequence using a first joint upstream cancellation coefficient sequence, to determine the NEXT signals in the upstream signals of all the COs; and perform NEXT cancellation processing on the first signal sequence using the determined NEXT signals, to obtain a second signal sequence, where the first joint upstream cancellation coefficient sequence is formed by combining an NEXT cancellation coefficient sequence formed by NEXT cancellation coefficients that are used to cancel the NEXT signals in the upstream signals of all the COs and the FEXT cancellation coefficient sequence formed by the FEXT cancellation coefficients that are used to cancel the FEXT signals in the upstream signals of all the COs.

With reference to the first possible implementation manner of the third aspect, in a third possible implementation manner, the joint canceller is configured to process the downstream signal sequence using a second joint upstream cancellation coefficient sequence, to determine the NEXT signals in the upstream signals of all the COs, and perform NEXT cancellation processing on the first signal sequence using the determined NEXT signals, to obtain a second signal sequence, where the second joint upstream cancellation coefficient sequence is formed by combining an NEXT cancellation coefficient sequence formed by NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and a precoding coefficient sequence formed by precoding coefficients that correspond to the downstream signals of all the COs.

With reference to the third aspect, in a fourth possible implementation manner, the transceiver is configured to receive the upstream signal that is sent by the CPE corresponding to each CO and that is received and forwarded by the CO, and form the upstream signal sequence including the upstream signals of all the COs; and the joint canceller is configured to process the downstream signal sequence using a third joint upstream cancellation coefficient sequence, to determine the NEXT signals and Echo interfering signals in the upstream signals of all the COs, where the third joint upstream cancellation coefficient sequence is formed by combining an Echo cancellation coefficient sequence formed by Echo cancellation coefficients that are used to cancel the Echo interfering signals in the upstream signals of all the COs, an NEXT cancellation coefficient sequence formed by NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and a precoding coefficient sequence formed by precoding coefficients that correspond to the downstream signals of all the COs.

With reference to the third aspect, the first possible implementation manner of the third aspect, the second possible implementation manner of the third aspect, the third possible implementation manner of the third aspect, or the fourth possible implementation manner of the third aspect, in a fifth possible implementation manner, the transceiver is further configured to obtain an upstream pilot signal that is sent by each CPE according to a specified period to a CO corresponding to the CPE and that is used to update a joint upstream cancellation coefficient sequence, form a first upstream pilot signal sequence, obtain a downstream pilot signal that is sent by each CO according to the period to CPE corresponding to the CO and that is used to update the joint upstream cancellation coefficient sequence, and form a downstream pilot signal sequence; and the joint canceller is further configured to perform cancellation processing on an FEXT signal in the first upstream pilot signal sequence using the FEXT cancellation coefficient sequence, to obtain a second upstream pilot signal sequence, and process the downstream pilot signal sequence using a currently-used joint upstream cancellation coefficient sequence, to determine NEXT signals in upstream pilot signals; and perform NEXT cancellation processing on the second upstream pilot signal sequence using the determined NEXT signals, to obtain a third upstream pilot signal sequence; determine a variation of the joint upstream cancellation coefficient sequence according to the third upstream pilot signal sequence and a preconfigured fourth upstream pilot signal sequence that is formed by upstream pilot signals including no interfering signal; and update, according to the determined variation, the currently-used joint upstream cancellation coefficient sequence, where the joint upstream cancellation coefficient sequence is the first joint upstream cancellation coefficient sequence, the second joint upstream cancellation coefficient sequence, or the third joint upstream cancellation coefficient sequence.

With reference to the fifth possible implementation manner of the third aspect, in a sixth possible implementation manner, the joint upstream cancellation coefficient sequence is the first joint upstream cancellation coefficient sequence that is formed by combining the NEXT cancellation coefficient sequence formed by the NEXT cancellation coefficients that are used to cancel the NEXT signals in the upstream signals of all the COs and the FEXT cancellation coefficient sequence formed by the FEXT cancellation coefficients that are used to cancel the FEXT signals in the upstream signals of all the COs; or the second joint upstream cancellation coefficient sequence that is formed by combining the NEXT cancellation coefficient sequence formed by the NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and the precoding coefficient sequence formed by the precoding coefficients that correspond to the downstream signals of all the COs; or the third joint upstream cancellation coefficient sequence that is formed by combining the Echo cancellation coefficient sequence formed by the Echo cancellation coefficients that are used to cancel the Echo interfering signals in the upstream signals of all the COs, the NEXT cancellation coefficient sequence formed by the NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and the precoding coefficient sequence formed by the precoding coefficients that correspond to the downstream signals of all the COs.

According to a fourth aspect, a DSL system is provided, where the DSL system includes multiple DSL lines, each DSL line is connected to one CO and one CPE, and the DSL system further includes a VCE that separately communicates with the CO and the CPE, where the CO is configured to receive an upstream signal sent by CPE corresponding to the CO; send a downstream signal to the CPE corresponding to the CO; send the received upstream signal and the sent downstream signal to the VCE; and receive an upstream signal that is returned by the VCE and that includes no interfering signal; the CPE is configured to send an upstream signal to a CO corresponding to the CPE; and the VCE is configured to obtain an upstream signal that is sent by CPE corresponding to each CO and that is received by the CO, form an upstream signal sequence including upstream signals of all COs, obtain a downstream signal that is sent by each CO to the CPE corresponding to each CO, and form a downstream signal sequence including downstream signals of all the COs; perform FEXT cancellation processing on the upstream signal sequence using an FEXT cancellation coefficient sequence formed by FEXT cancellation coefficients that are used to cancel far-end crosstalk FEXT signals in the upstream signals of all the COs, to obtain a first signal sequence, and process the downstream signal sequence using a preconfigured joint upstream cancellation coefficient sequence, to determine near-end crosstalk NEXT signals in the upstream signals of all the COs; and perform NEXT cancellation processing on the first signal sequence using the determined NEXT signals, to obtain a second signal sequence, and send upstream signals in the second signal sequence to all the COs.

With reference to the fourth aspect, in a first possible implementation manner, the CO is configured to perform Echo interference cancellation processing on the received upstream signal, to obtain an upstream signal including no Echo interfering signal; and send the upstream signal including no Echo interfering signal to the VCE; and the VCE is configured to receive an upstream signal that is forwarded by each CO and that includes no Echo interfering signal, and form an upstream signal sequence including upstream signals that are of all the COs and that include no Echo interfering signal.

With reference to the first possible implementation manner of the fourth aspect, in a second possible implementation manner, the VCE is configured to perform precoding processing on the downstream signal sequence according to a precoding coefficient sequence formed by precoding coefficients of the downstream signals of all the COs, to obtain a downstream precoding signal sequence corresponding to the downstream signal sequence; and process the downstream precoding signal sequence using a first joint upstream cancellation coefficient sequence, to determine the NEXT signals in the upstream signals of all the COs, where the first joint upstream cancellation coefficient sequence is formed by combining an NEXT cancellation coefficient sequence formed by NEXT cancellation coefficients that are used to cancel the NEXT signals in the upstream signals of all the COs and the FEXT cancellation coefficient sequence formed by the FEXT cancellation coefficients that are used to cancel the FEXT signals in the upstream signals of all the COs.

With reference to the first possible implementation manner of the fourth aspect, in a third possible implementation manner, the VCE is configured to process the downstream signal sequence using a second joint upstream cancellation coefficient sequence, to determine the NEXT signals in the upstream signals of all the COs, where the second joint upstream cancellation coefficient sequence is formed by combining an NEXT cancellation coefficient sequence formed by NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and a precoding coefficient sequence formed by precoding coefficients that correspond to the downstream signals of all the COs.

With reference to the fourth aspect, in a fourth possible implementation manner, the VCE is configured to process the downstream signal sequence using a third joint upstream cancellation coefficient sequence, to determine the NEXT signals and Echo interfering signals in the upstream signals of all the COs, where the third joint upstream cancellation coefficient sequence is formed by combining an Echo cancellation coefficient sequence formed by Echo cancellation coefficients that are used to cancel the Echo interfering signals in the upstream signals of all the COs, an NEXT cancellation coefficient sequence formed by NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and a precoding coefficient sequence formed by precoding coefficients that correspond to the downstream signals of all the COs.

With reference to the fourth aspect, the first possible implementation manner of the fourth aspect, the second possible implementation manner of the fourth aspect, the third possible implementation manner of the fourth aspect, or the fourth possible implementation manner of the fourth aspect, in a fifth possible implementation manner, the CO is further configured to receive an upstream pilot signal that is sent by corresponding CPE according to a specified period and that is used to update a joint upstream cancellation coefficient sequence, send, according to the period and to the CPE corresponding to the CO, a downstream pilot signal used to update the joint upstream cancellation coefficient sequence, and send the received upstream pilot signal and the sent downstream pilot signal to the VCE; the CPE is further configured to send, according to the specified period and to the corresponding CO, the upstream pilot signal used to update the joint upstream cancellation coefficient sequence; and the VCE is further configured to obtain an upstream pilot signal that is sent by the CPE corresponding to each CO, that is received by the CO, and that is used to update a joint upstream cancellation coefficient sequence, form a first upstream pilot signal sequence, obtain a downstream pilot signal that is sent by each CO according to a period to the CPE corresponding to each CO and that is used to update the joint upstream cancellation coefficient sequence, and form a downstream pilot signal sequence; perform cancellation processing on an FEXT signal in the first upstream pilot signal sequence using the FEXT cancellation coefficient sequence, to obtain a second upstream pilot signal sequence, and process the downstream pilot signal sequence using a currently-used joint upstream cancellation coefficient sequence, to determine NEXT signals in upstream pilot signals; perform NEXT cancellation processing on the second upstream pilot signal sequence using the determined NEXT signals, to obtain a third upstream pilot signal sequence; determine a variation of the joint upstream cancellation coefficient sequence according to the third upstream pilot signal sequence and a preconfigured fourth upstream pilot signal sequence that is formed by upstream pilot signals including no interfering signal; and update, according to the determined variation, the currently-used joint upstream cancellation coefficient sequence.

With reference to the fifth possible implementation manner of the fourth aspect, in a sixth possible implementation manner, the joint upstream cancellation coefficient sequence is the first joint upstream cancellation coefficient sequence that is formed by combining the NEXT cancellation coefficient sequence formed by the NEXT cancellation coefficients that are used to cancel the NEXT signals in the upstream signals of all the COs and the FEXT cancellation coefficient sequence formed by the FEXT cancellation coefficients that are used to cancel the FEXT signals in the upstream signals of all the COs; or the second joint upstream cancellation coefficient sequence that is formed by combining the NEXT cancellation coefficient sequence formed by the NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and the precoding coefficient sequence formed by the precoding coefficients that correspond to the downstream signals of all the COs; or the third joint upstream cancellation coefficient sequence that is formed by combining the Echo cancellation coefficient sequence formed by the Echo cancellation coefficients that are used to cancel the Echo interfering signals in the upstream signals of all the COs, the NEXT cancellation coefficient sequence formed by the NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and the precoding coefficient sequence formed by the precoding coefficients that correspond to the downstream signals of all the COs.

According to the method, the device, and the system that are provided in the present disclosure, as long as joint cancellation processing is performed once, an NEXT signal and an FEXT signal in an upstream signal received by each CO can be canceled, which improves a processing speed and reduces a processing delay.

DESCRIPTION OF EMBODIMENTS

Figure 1:
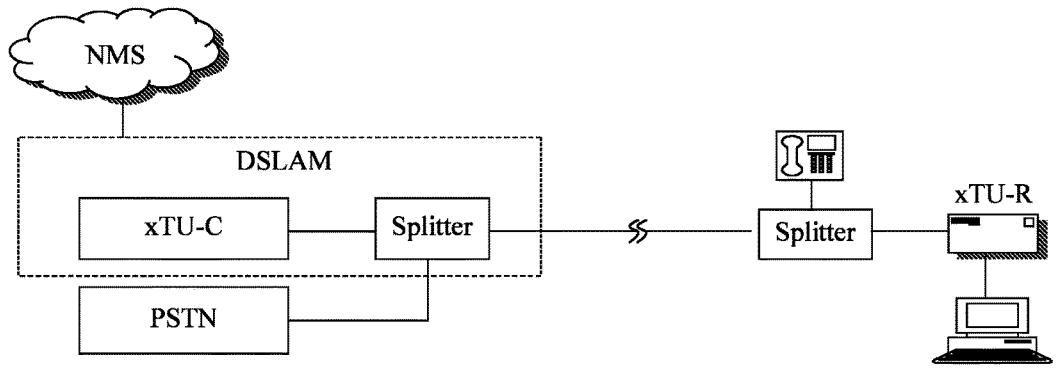
FIG. 1 is a schematic diagram of a system model of a DSL system.
Figure 2:
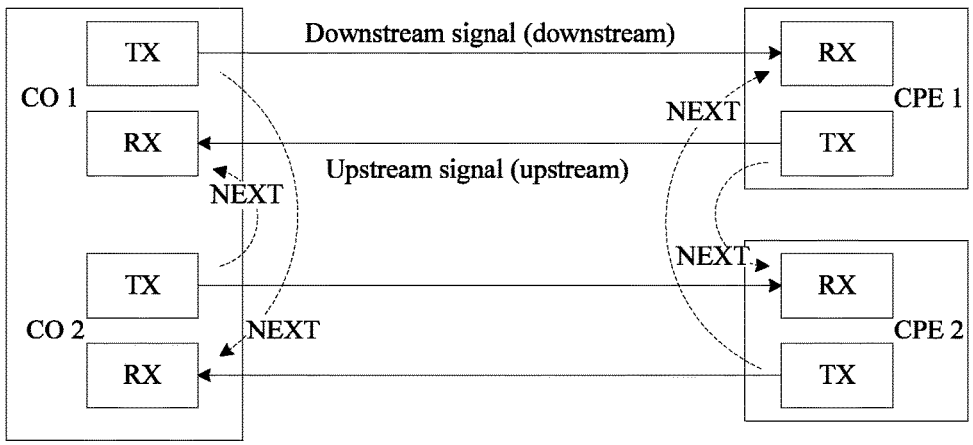
FIG. 2 is a schematic diagram of forming NEXT in a DSL system.
Figure 3:
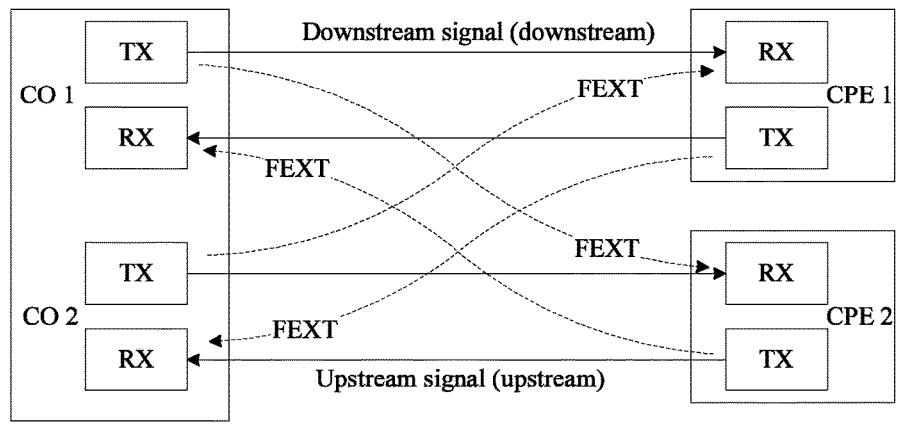
FIG. 3 is a schematic diagram of forming FEXT in a DSL system.
Figure 4:
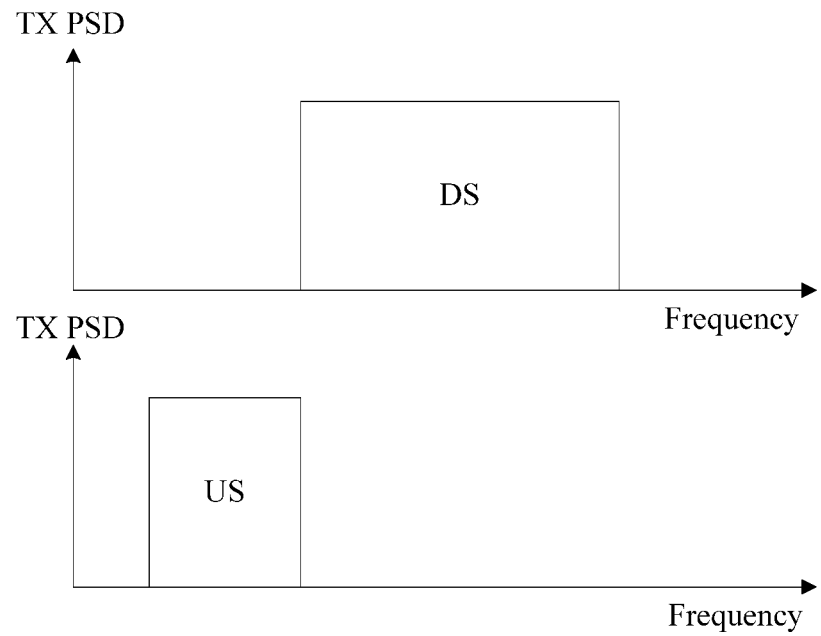
FIG. 4 is a schematic diagram of a frequency spectrum of an FDD DSL system.
Figure 5:
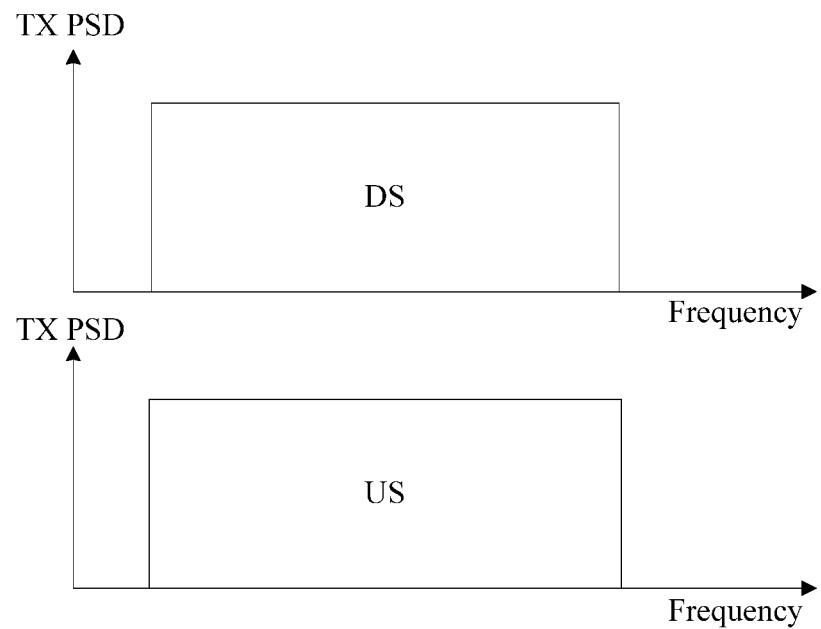
FIG. 5 is a schematic diagram of a frequency spectrum of an OSD DSL system.

In the present disclosure, FEXT cancellation processing is performed on an upstream signal sequence using an FEXT cancellation coefficient sequence, to obtain a first signal sequence, and a downstream signal sequence is processed using a preconfigured joint upstream cancellation coefficient sequence, to determine near-end crosstalk NEXT signals in upstream signals of all COs; and NEXT cancellation processing is performed on the first signal sequence using the determined NEXT signals, to obtain a second signal sequence. Therefore, a processing solution for simultaneously canceling an NEXT signal and an FEXT signal in each upstream signal is provided, which improves a processing speed and reduces a processing delay.

In embodiments of the present disclosure, after COs and CPEs are deployed in a DSLAM access system, a joint upstream cancellation coefficient sequence (a matrix) is first determined according to a configured pilot signal, normal communication is then performed between a CO side and a CPE side, and cancellation processing is performed, according to the joint upstream cancellation coefficient sequence (the matrix), on an interfering signal (including an FEXT signal and an NEXT signal) in an upstream signal received on the CO side, to obtain an upstream signal including no interfering signal. It should be noted that, a CO, a CO apparatus, and a CO unit in this specification all refer to a processing unit or a processing apparatus that corresponds to a processing unit of each CPE and that is on an AN side. The joint upstream cancellation coefficient sequence (the matrix) in the present disclosure is described below.

The joint upstream cancellation coefficient sequence (the matrix) is estimated using an upstream synchronization symbol and a downstream synchronization symbol of a down link (that is, a link from a CO to CPE) and an up link (that is, a link from CPE to a CO) of all communications lines in a synchronization system.

A transceiver of each CO and a transceiver of CPE corresponding to the CO are controlled to send an orthogonal pilot sequence on a downstream synchronization symbol and an upstream synchronization symbol of each pair of communications lines; a downstream FEXT crosstalk channel, a downstream NEXT crosstalk channel, an upstream FEXT crosstalk channel, and an upstream NEXT crosstalk channel are separately estimated according to a downstream error signal fed back by each CPE and an upstream error signal fed back by each CO, to estimate a precoding coefficient of a downstream signal of each CO and a cancellation coefficient of each type of interfering signal (including an FEXT cancellation coefficient used to cancel an FEXT signal in an upstream signal of each CO, an NEXT cancellation coefficient used to cancel an NEXT signal in the upstream signal of each CO, an Echo cancellation coefficient used to cancel an Echo interfering signal in the upstream signal of each CO, and the like), so that an FEXT cancellation coefficient sequence (a matrix), an NEXT cancellation coefficient sequence (a matrix), an Echo cancellation coefficient sequence (a matrix), a precoding coefficient sequence (a matrix), and the like can be determined. The joint upstream cancellation coefficient sequence (the matrix) may be determined in the following three specific manners.

Manner 1: The obtained FEXT cancellation coefficient sequence (the matrix) and the obtained NEXT cancellation coefficient sequence (the matrix) are combined to obtain a first joint upstream cancellation coefficient sequence (a matrix).

Preferably, the first joint upstream cancellation coefficient sequence (the matrix) M is: $M=C\times Q$.

C is the obtained FEXT cancellation coefficient sequence (the matrix), and Q is the obtained NEXT cancellation coefficient sequence (the matrix).

Manner 2: The obtained FEXT cancellation coefficient sequence (the matrix), the obtained NEXT cancellation coefficient sequence (the matrix), and the obtained precoding coefficient sequence (the matrix) are combined to obtain a second joint upstream cancellation coefficient sequence (a matrix).

Preferably, the second joint upstream cancellation coefficient sequence (the matrix) M is: $M=C\times Q\times P$.

C is the obtained FEXT cancellation coefficient sequence (the matrix), Q is the obtained NEXT cancellation coefficient sequence (the matrix), and P is the obtained precoding coefficient sequence (the matrix).

Manner 3: The obtained FEXT cancellation coefficient sequence (the matrix), the obtained NEXT cancellation coefficient sequence (the matrix), the obtained Echo cancellation coefficient sequence (the matrix), and the precoding coefficient sequence (the matrix) are combined to obtain a third joint upstream cancellation coefficient sequence (a matrix).

Preferably, the third joint upstream cancellation coefficient sequence (a matrix) M is:

$$M=C\times(Q+E)\times P, \text{ where}$$

C is the obtained FEXT cancellation coefficient sequence (the matrix), Q is the obtained NEXT cancellation coefficient sequence (the matrix), P is the obtained precoding coefficient sequence (the matrix), and E is the obtained Echo cancellation coefficient sequence (the matrix).

The following further describes the embodiments of the present disclosure in detail with reference to accompanying drawings in this specification. It should be understood that the embodiments described herein are merely used to describe and explain the present disclosure but are not intended to limit the present disclosure.

Figure 6:
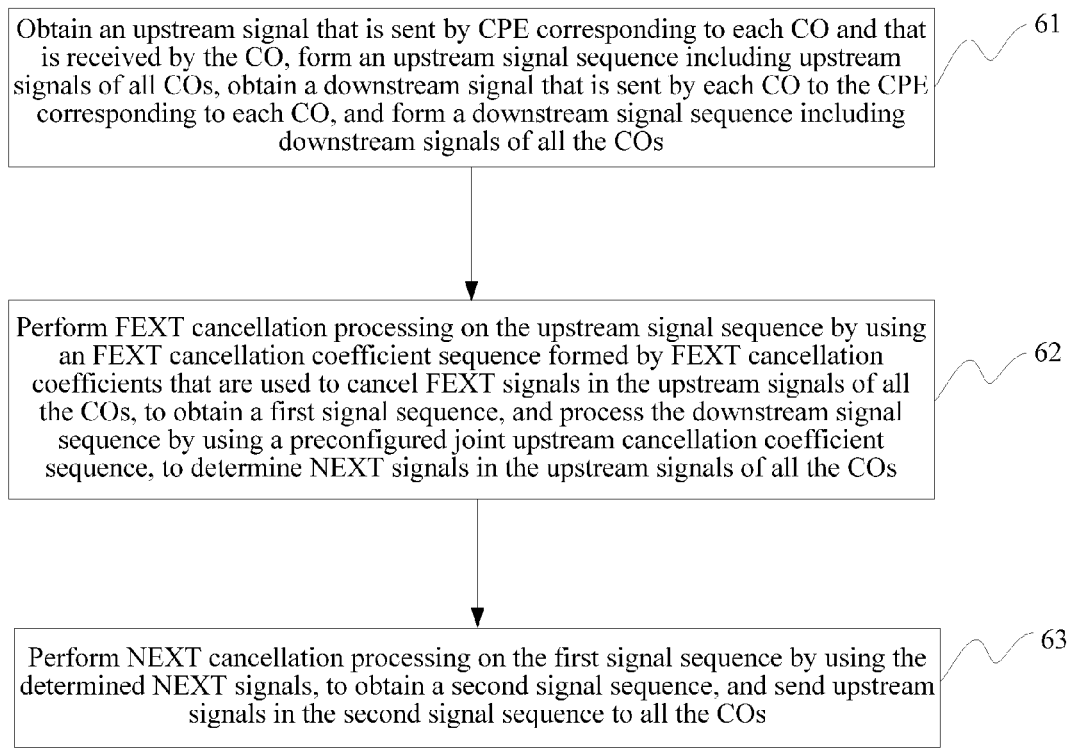
FIG. 6 is a schematic flowchart of a method for canceling crosstalk between lines in a DSL system according to the present disclosure.

Referring to FIG. 6, the present disclosure provides a method for canceling crosstalk between lines in a DSL system. The method includes the following steps.

Step 61: Obtain an upstream signal that is sent by CPE corresponding to each CO and that is received by the CO, form an upstream signal sequence including upstream signals of all COs, obtain a downstream signal that is sent by each CO to the CPE corresponding to each CO, and form a downstream signal sequence including downstream signals of all the COs.

Step 62: Perform FEXT cancellation processing on the upstream signal sequence using an FEXT cancellation coefficient sequence formed by FEXT cancellation coefficients that are used to cancel FEXT signals in the upstream signals of all the COs, to obtain a first signal sequence, and process the downstream signal sequence using a preconfigured joint upstream cancellation coefficient sequence, to determine NEXT signals in the upstream signals of all the COs.

In this step, the performing FEXT cancellation processing on the upstream signal sequence using an FEXT cancellation coefficient sequence formed by FEXT cancellation coefficients that are used to cancel FEXT signals in the upstream signals of all the COs, and the processing the downstream signal sequence using a preconfigured joint upstream cancellation coefficient sequence, to determine NEXT signals in the upstream signals of all the COs may be performed simultaneously.

Step 63: Perform NEXT cancellation processing on the first signal sequence using the determined NEXT signals, to obtain a second signal sequence, and send upstream signals in the second signal sequence to all the COs.

In this step, the second signal sequence obtained after NEXT cancellation processing is performed on the first signal sequence includes upstream signals including no interfering signal, and the upstream signals including no interfering signal in the second signal sequence are sent to all the COs.

According to the method provided in the present disclosure, as long as joint cancellation processing is performed once, an NEXT signal and an FEXT signal in an upstream signal received by each CO can be canceled, which improves a processing speed and reduces a processing delay.

In this embodiment of the present disclosure, step 61 to step 63 are executed by a VCE, and the VCE is connected to a transceiver of each CO, to obtain an upstream signal that is sent by corresponding CPE and that is received by the CO, and a downstream signal that is sent by each CO to corresponding CPE. The VCE further communicates with a transceiver of each CPE using each CO, to control the CPE to send a pilot signal.

During implementation, preferably, in step 62, the performing FEXT cancellation processing on the upstream signal sequence using an FEXT cancellation coefficient sequence, to obtain a first signal sequence is forming the FEXT cancellation coefficient sequence C using the FEXT cancellation coefficients that are used to cancel the FEXT signals in the upstream signals of all the COs; and multiplying the FEXT cancellation coefficient sequence C by the upstream signal sequence Y, to obtain the first signal sequence C1.

During implementation, preferably, the processing the downstream signal sequence using a preconfigured joint upstream cancellation coefficient sequence, to determine near-end crosstalk NEXT signals in the upstream signals of all the COs is multiplying the joint upstream cancellation coefficient sequence by the downstream signal sequence X, to obtain a sequence including the NEXT signals in the upstream signals of all the COs.

In this embodiment of the present disclosure, when different joint upstream cancellation coefficient sequences are used, step 62 is processed in different manners, which are as follows:

1. A first joint upstream cancellation coefficient sequence is used, where for a specific form, refer to a description in manner 1.

In this manner, step 61 is receiving an upstream signal that is forwarded by each CO and that includes no Echo interfering signal, and forming an upstream signal sequence including upstream signals that are of all the COs and that include no Echo interfering signal, where after each CO receives an upstream signal sent by the CPE corresponding to each CO, each CO performs Echo interference cancellation processing on the received upstream signal, to obtain an upstream signal including no Echo interfering signal.

It should be noted that, for each CO, an Echo interfering signal of the CO refers to a signal obtained when a downstream signal sent by the CO to CPE corresponding to the CO is transmitted back, and interferes with an upstream signal received by the CO.

In this manner, in step 62, the processing the downstream signal sequence using a preconfigured joint upstream cancellation coefficient sequence, to determine NEXT signals in the upstream signals of all the COs is performing precoding processing on the downstream signal sequence according to a precoding coefficient sequence formed by precoding coefficients of the downstream signals of all the COs, to obtain a downstream precoding signal sequence corresponding to the downstream signal sequence; and processing the downstream precoding signal sequence using the first joint upstream cancellation coefficient sequence, to determine the NEXT signals in the upstream signals of all the COs.

It should be noted that, for any CO, an NEXT signal included in an upstream signal received by the CO is caused by a downstream signal sent by another CO, and an FEXT signal included in the upstream signal received by the CO is caused by an upstream signal sent by CPE corresponding to another CO.

In this manner, the performing precoding processing on the downstream signal sequence according to a precoding coefficient sequence formed by precoding coefficients of the downstream signals of all the COs, to obtain a downstream precoding signal sequence corresponding to the downstream signal sequence is forming the precoding coefficient sequence P using the precoding coefficients of the downstream signals of all the COs; and multiplying the precoding coefficient sequence P by the downstream signal sequence X, to obtain the downstream precoding signal sequence.

2. A second joint upstream cancellation coefficient sequence is used, where for a specific form, refer to a description in manner 2.

In this manner, step 61 is receiving an upstream signal that is forwarded by each CO and that includes no Echo interfering signal, and forming an upstream signal sequence including upstream signals that are of all the COs and that include no Echo interfering signal, where after each CO receives an upstream signal sent by the CPE corresponding to each CO, each CO performs Echo interference cancellation processing on the received upstream signal, to obtain an upstream signal including no Echo interfering signal.

It should be noted that, for each CO, an Echo interfering signal of the CO refers to a signal obtained when a downstream signal sent by the CO to CPE corresponding to the CO is transmitted back, and interferes with an upstream signal received by the CO.

In this manner, in step 62, the processing the downstream signal sequence using a preconfigured joint upstream cancellation coefficient sequence, to determine NEXT signals in the upstream signals of all the COs is processing the downstream signal sequence using the second joint upstream cancellation coefficient sequence, to determine the NEXT signals in the upstream signals of all the COs.

It should be noted that, for any CO, an NEXT signal included in an upstream signal received by the CO is caused by a downstream signal sent by another CO, and an FEXT signal included in the upstream signal received by the CO is caused by an upstream signal sent by CPE corresponding to another CO.

A cancellation processing process in this manner is described in detail, where it is assumed that a received upstream signal (that is, a signal that is sent by CPE and that is received by a CO) $Y_{us}$ is:

$Y_{us}=H_{fext}X_{us}+H_{next}X_{ds}+H_{echo}X_{ds}$, where $X_{ds}$ indicates a sent downstream signal (that is, a signal sent by a CO to CPE); $X_{us}$ indicates a sent upstream signal (that is, a signal sent by CPE to a CO, where the signal herein includes no interference signal); $H_{fext}$ indicates an upstream FEXT coefficient sequence, where a diagonal entry thereof is a direct channel response (a direct channel refers to a communication channel between CPE and a CO corresponding to the CPE), and a non-diagonal entry is an FEXT crosstalk channel response (an FEXT crosstalk channel refers to a virtual communication channel between a CO and another CPE except CPE corresponding to the CO); $H_{next}$ indicates an upstream NEXT coefficient sequence, where a diagonal entry thereof is 0; and $H_{echo}$ indicates an upstream Echo coefficient sequence, where a diagonal entry thereof is an Echo channel response corresponding to each CO, and a non-diagonal entry is 0.

After cancellation processing, a received upstream signal obtained after cancellation is $\widetilde{Y_{us}}=C(Y_{us}-E\cdot PX_{ds}-Q\cdot PX_{ds})$, where P indicates a precoding coefficient sequence of a sent downstream signal, C is an upstream FEXT cancellation coefficient sequence, Q is an upstream NEXT cancellation coefficient sequence, and E is an upstream Echo cancellation coefficient sequence.

The foregoing formula may be transformed to obtain:

$\widetilde{Y_{us}}=C(Y_{us}-E\cdot PX_{ds})-CQ\cdot PX_{ds}$, where $Y_{us}-E\cdot PX_{ds}$ is a received upstream signal obtained after Echo cancellation processing, and CQP is a second joint cancellation coefficient sequence.

3. A third joint upstream cancellation coefficient sequence is used, where for a specific form, refer to a description in manner 3.

In this manner, step 61 is receiving the upstream signal that is sent by the CPE corresponding to each CO and that is received and forwarded by the CO, and forming the upstream signal sequence including the upstream signals of all the COs. In this manner, each CO does not need to perform Echo cancellation processing on a received upstream signal in advance.

In this manner, in step 62, the processing the downstream signal sequence using a preconfigured joint upstream cancellation coefficient sequence, to determine NEXT signals in the upstream signals of all the COs is processing the downstream signal sequence using the third joint upstream cancellation coefficient sequence, to determine the NEXT signals and Echo interfering signals in the upstream signals of all the COs.

It should be noted that, for any CO, an NEXT signal included in an upstream signal received by the CO is caused by a downstream signal sent by another CO, and an FEXT signal included in the upstream signal received by the CO is caused by an upstream signal sent by CPE corresponding to another CO.

For each CO, an Echo interfering signal of the CO refers to a signal obtained when a downstream signal sent by the CO to CPE corresponding to the CO is transmitted back, and interferes with an upstream signal received by the CO.

A cancellation processing process in this manner is described in detail, where it is assumed that a received upstream signal $Y_{us}$ is:

$Y_{us}=H_{fext}X_{us}+H_{next}X_{ds}+H_{echo}X_{ds}$, where $X_{ds}$ indicates a sent downstream signal; $X_{us}$ indicates a sent upstream signal; $H_{fext}$ indicates an upstream FEXT coefficient sequence, where a diagonal entry thereof is a direct channel response, and a non-diagonal entry is an FEXT crosstalk channel response; $H_{next}$ indicates an upstream NEXT coefficient sequence, where a diagonal entry thereof is 0; and $H_{echo}$ indicates an upstream Echo coefficient sequence, where a diagonal entry thereof is an Echo channel response corresponding to each CO, and a non-diagonal entry is 0.

After cancellation processing, a signal after cancellation may be obtained:

$\widetilde{Y_{us}}=C(Y_{us}-E\cdot PX_{ds}-Q\cdot PX_{ds})$, where

P indicates a precoding coefficient sequence of a downstream signal, C is an upstream FEXT cancellation coefficient sequence, Q is an upstream NEXT cancellation coefficient sequence, and E is an upstream Echo cancellation coefficient.

In this manner, the upstream Echo cancellation coefficient is considered as an NEXT cancellation coefficient used to cancel an interference from a downstream signal of a CO to an upstream signal of the CO, and is placed in a diagonal line of the NEXT cancellation coefficient sequence, to be combined into a new upstream NEXT cancellation coefficient sequence: $\overline{Q}=Q+E$; and the foregoing formula may be transformed to obtain: $\widetilde{Y_{us}}=CY_{us}-C\overline{Q}\times PX_{ds}$, where $C\overline{Q}P$ is a third joint cancellation coefficient sequence.

Based on any one of the foregoing embodiments, the method further includes updating a currently-used joint upstream cancellation coefficient sequence, which is as follows: obtaining an upstream pilot signal that is sent by the CPE corresponding to each CO, that is received by the CO, and that is used to update a joint upstream cancellation coefficient sequence, forming a first upstream pilot signal sequence, obtaining a downstream pilot signal that is sent by each CO according to a period to the CPE corresponding to each CO and that is used to update the joint upstream cancellation coefficient sequence, and forming a downstream pilot signal sequence; performing cancellation processing on an FEXT signal in the first upstream pilot signal sequence using the FEXT cancellation coefficient sequence, to obtain a second upstream pilot signal sequence, and processing the downstream pilot signal sequence using the currently-used joint upstream cancellation coefficient sequence, to determine NEXT signals in upstream pilot signals; performing NEXT cancellation processing on the second upstream pilot signal sequence using the determined NEXT signals, to obtain a third upstream pilot signal sequence; determining a variation of the joint upstream cancellation coefficient sequence according to the third upstream pilot signal sequence and a preconfigured fourth upstream pilot signal sequence that is formed by upstream pilot signals including no interfering signal; and updating, according to the determined variation, the currently-used joint upstream cancellation coefficient sequence.

In this embodiment of the present disclosure, when each CO communicates with CPE corresponding to the CO, the CPE may periodically send a pilot signal to the CO, that is, may send a pilot signal in a process of sending communication data, for example, each time after sending 255 symbols, the CPE sends one pilot signal.

According to the method for updating a joint upstream cancellation coefficient sequence provided in this embodiment of the present disclosure, only a variation of a joint upstream cancellation coefficient sequence needs to be determined, and it is avoided that an NEXT cancellation coefficient sequence, an FEXT cancellation coefficient sequence, a precoding coefficient sequence, and an Echo cancellation coefficient sequence need to be separately updated, and that updated cancellation coefficient sequences are combined to form a new joint upstream cancellation coefficient sequence, thereby reducing complexity of a cancellation algorithm.

For example, a received upstream signal $Y_{us}$ on an upstream synchronization symbol before cancellation is:

$Y_{us} = H_{fext}X_{us} + \overline{H_{next}}X_{ds}$, where $X_{ds}$ indicates a sent downstream signal; $X_{us}$ indicates a sent upstream signal; $H_{fext}$ indicates an upstream FEXT channel sequence, where a diagonal entry thereof is a direct channel response, and a non-diagonal entry is an FEXT crosstalk channel response; and $\overline{H_{next}}$ indicates an upstream NEXT coefficient sequence, and $\overline{H_{next}} = H_{next} + H_{echo}$, where a diagonal entry thereof is an upstream Echo channel response, and a non-diagonal entry is an NEXT crosstalk channel response.

A received upstream signal $\widetilde{Y_{us}}$ on an upstream synchronization symbol after cancellation is:

$\widetilde{Y_{us}} = CH_{fext}X_{us} + (C\overline{H_{next}}P - C\overline{Q}P)X_{ds}$.

It is assumed that $\overline{C} = C\overline{Q}P, \Delta\overline{C} = C\overline{H_{next}}P - C\overline{Q}P$. In this way, only a variation of a joint upstream cancellation coefficient sequence needs to be determined, and variations $\Delta C, \Delta\overline{Q}, \Delta P$ of all coefficient sequences do not need to be separately determined, thereby reducing algorithm complexity.

The processing procedure of the foregoing method may be implemented using a software program, the software program may be stored in a storage medium, and when the stored software program is invoked, the steps of the foregoing method are performed.

Figure 7:
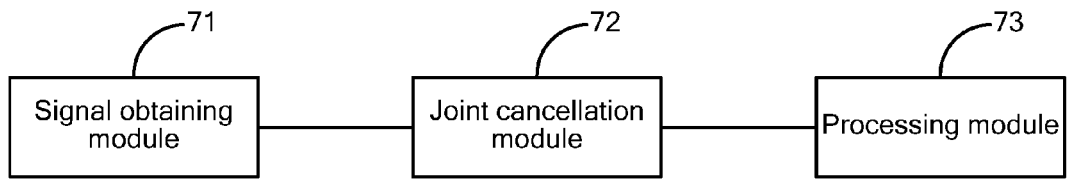
FIG. 7 is a schematic structural diagram of a first VCE according to the present disclosure.

Based on the same inventive idea, the present disclosure further provides a vectoring control entity VCE, where the VCE is applied in a DSL system, the DSL system includes multiple DSL lines, and each DSL line is connected to one CO and one CPE. Referring to FIG. 7, the VCE includes a signal obtaining module 71 configured to obtain an upstream signal that is sent by CPE corresponding to each CO and that is received by the CO, form an upstream signal sequence including upstream signals of all COs, obtain a downstream signal that is sent by each CO to the CPE corresponding to each CO, and form a downstream signal sequence including downstream signals of all the COs; a joint cancellation module 72 configured to perform FEXT cancellation processing on the upstream signal sequence using an FEXT cancellation coefficient sequence formed by FEXT cancellation coefficients that are used to cancel FEXT signals in the upstream signals of all the COs, to obtain a first signal sequence, and process the downstream signal sequence using a preconfigured joint upstream cancellation coefficient sequence, to determine NEXT signals in the upstream signals of all the COs; and a processing module 73 configured to perform NEXT cancellation processing on the first signal sequence using the determined NEXT signals, to obtain a second signal sequence, and send upstream signals in the second signal sequence to all the COs.

During implementation, in a first specific implementation manner, the signal obtaining module 71 is configured to receive an upstream signal that is forwarded by each CO and that includes no Echo interfering signal, and form an upstream signal sequence including upstream signals that are of all the COs and that include no Echo interfering signal, where after each CO receives an upstream signal sent by the CPE corresponding to each CO, each CO performs Echo interference cancellation processing on the received upstream signal, to obtain an upstream signal including no Echo interfering signal.

In this manner, the processing, by the joint cancellation module 72, the downstream signal sequence using a preconfigured joint upstream cancellation coefficient sequence, to determine NEXT signals in the upstream signals of all the COs is performing precoding processing on the downstream signal sequence according to a precoding coefficient sequence formed by precoding coefficients of the downstream signals of all the COs, to obtain a downstream precoding signal sequence corresponding to the downstream signal sequence; and processing the downstream precoding signal sequence using a first joint upstream cancellation coefficient sequence, to determine the NEXT signals in the upstream signals of all the COs, where the first joint upstream cancellation coefficient sequence is formed by combining an NEXT cancellation coefficient sequence formed by NEXT cancellation coefficients that are used to cancel the NEXT signals in the upstream signals of all the COs and the FEXT cancellation coefficient sequence formed by the FEXT cancellation coefficients that are used to cancel the FEXT signals in the upstream signals of all the COs.

In a second specific implementation manner, the signal obtaining module 71 is configured to receive an upstream signal that is forwarded by each CO and that includes no Echo interfering signal, and form an upstream signal sequence including upstream signals that are of all the COs and that include no Echo interfering signal, where after each CO receives an upstream signal sent by the CPE corresponding to each CO, each CO performs Echo interference cancellation processing on the received upstream signal, to obtain an upstream signal including no Echo interfering signal.

In this manner, the processing, by the joint cancellation module 72, the downstream signal sequence using a preconfigured joint upstream cancellation coefficient sequence, to determine NEXT signals in the upstream signals of all the COs is processing the downstream signal sequence using a second joint upstream cancellation coefficient sequence, to determine the NEXT signals in the upstream signals of all the COs, where the second joint upstream cancellation coefficient sequence is formed by combining an NEXT cancellation coefficient sequence formed by NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and a precoding coefficient sequence formed by precoding coefficients that correspond to the downstream signals of all the COs.

In a third specific implementation manner, the signal obtaining module 71 is configured to receive the upstream signal that is sent by the CPE corresponding to each CO and that is received and forwarded by the CO, and form the upstream signal sequence including the upstream signals of all the COs; and In this manner, the processing, by the joint cancellation module 72, the downstream signal sequence using a preconfigured joint upstream cancellation coefficient sequence, to determine NEXT signals in the upstream signals of all the COs is processing the downstream signal sequence using a third joint upstream cancellation coefficient sequence, to determine the NEXT signals and Echo interfering signals in the upstream signals of all the COs, where the third joint upstream cancellation coefficient sequence is formed by combining an Echo cancellation coefficient sequence formed by Echo cancellation coefficients that are used to cancel the Echo interfering signals in the upstream signals of all the COs, an NEXT cancellation coefficient sequence formed by NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and a precoding coefficient sequence formed by precoding coefficients that correspond to the downstream signals of all the COs.

Based on any one of the foregoing embodiments, the signal obtaining module 71 is further configured to obtain an upstream pilot signal that is sent by each CPE according to a specified period to a CO corresponding to the CPE and that is used to update a joint upstream cancellation coefficient sequence, form a first upstream pilot signal sequence, obtain a downstream pilot signal that is sent by each CO according to the period to CPE corresponding to the CO and that is used to update the joint upstream cancellation coefficient sequence, and form a downstream pilot signal sequence; the joint cancellation module 72 is further configured to perform cancellation processing on an FEXT signal in the first upstream pilot signal sequence using the FEXT cancellation coefficient sequence, to obtain a second upstream pilot signal sequence, and process the downstream pilot signal sequence using a currently-used joint upstream cancellation coefficient sequence, to determine NEXT signals in upstream pilot signals; and the processing module 73 is further configured to perform NEXT cancellation processing on the second upstream pilot signal sequence using the determined NEXT signals, to obtain a third upstream pilot signal sequence; determine a variation of the joint upstream cancellation coefficient sequence according to the third upstream pilot signal sequence and a preconfigured fourth upstream pilot signal sequence that is formed by upstream pilot signals including no interfering signal; and update, according to the determined variation, the currently-used joint upstream cancellation coefficient sequence, where the joint upstream cancellation coefficient sequence is the first joint upstream cancellation coefficient sequence, the second joint upstream cancellation coefficient sequence, or the third joint upstream cancellation coefficient sequence.

Figure 8:
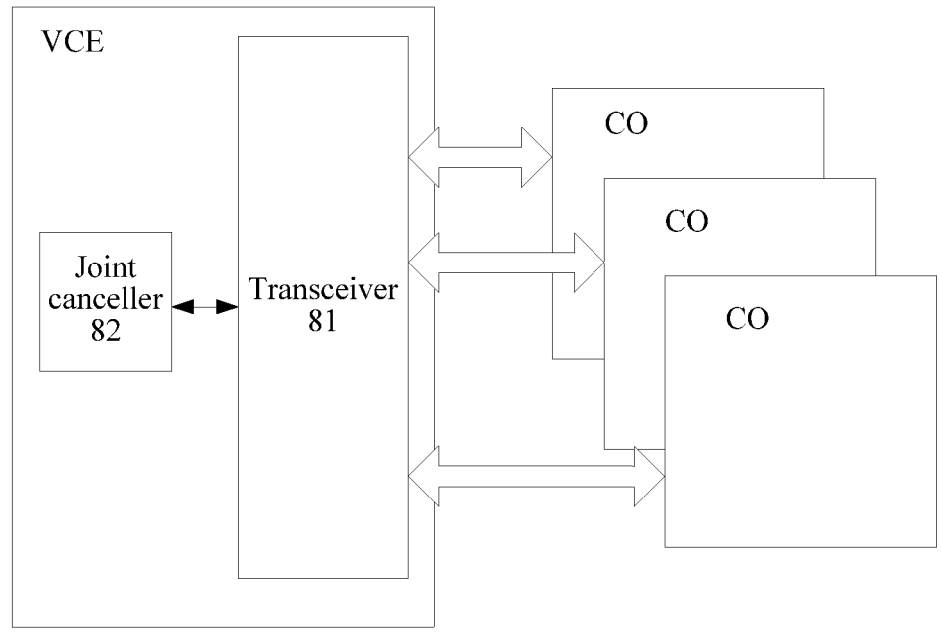
FIG. 8 is a schematic structural diagram of a second VCE according to the present disclosure.

Based on the same inventive idea, the present disclosure further provides a VCE, where the VCE is applied in a DSL system, the DSL system includes multiple DSL lines, and each DSL line is connected to one CO and one CPE. Referring to FIG. 8, the VCE includes a transceiver 81 configured to obtain an upstream signal that is sent by CPE corresponding to each CO and that is received by the CO, form an upstream signal sequence including upstream signals of all COs, obtain a downstream signal that is sent by each CO to the CPE corresponding to each CO, and form a downstream signal sequence including downstream signals of all the COs; and simultaneously send the upstream signal sequence and the downstream signal sequence to a joint canceller 82; the joint canceller 82 configured to perform FEXT cancellation processing on the upstream signal sequence using an FEXT cancellation coefficient sequence formed by FEXT cancellation coefficients that are used to cancel FEXT signals in the upstream signals of all the COs, to obtain a first signal sequence, process the downstream signal sequence using a preconfigured joint upstream cancellation coefficient sequence, to determine NEXT signals in the upstream signals of all the COs; perform NEXT cancellation processing on the first signal sequence using the determined NEXT signals, to obtain a second signal sequence; and send the second signal sequence to a transmitter 83; and the transmitter 83 configured to send upstream signals in the second signal sequence to all the COs.

During implementation, in a first specific implementation manner, the transceiver 81 is configured to receive an upstream signal that is forwarded by each CO and that includes no Echo interfering signal, and form an upstream signal sequence including upstream signals that are of all the COs and that include no Echo interfering signal, where after each CO receives an upstream signal sent by the CPE corresponding to each CO, each CO performs Echo interference cancellation processing on the received upstream signal, to obtain an upstream signal including no Echo interfering signal.

Figure 9:
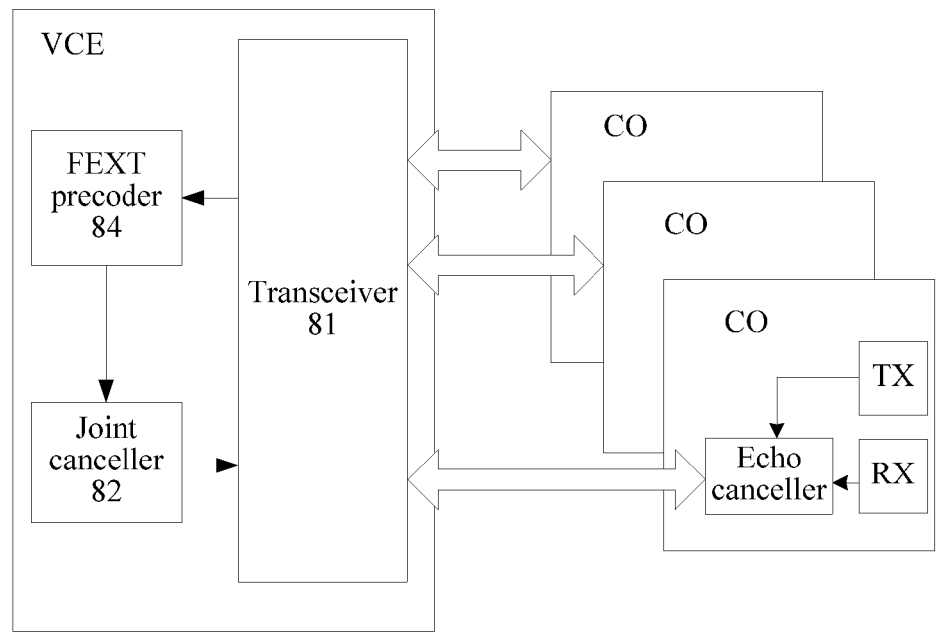
FIG. 9 is a schematic structural diagram of a third VCE according to the present disclosure.

In this manner, referring to FIG. 9, each CO includes an Echo canceller configured to perform Echo interference cancellation processing on the received upstream signal, to obtain an upstream signal including no Echo interfering signal.

In this manner, referring to FIG. 9, the VCE further includes an FEXT precoder 84 configured to perform precoding processing on the downstream signal sequence according to a precoding coefficient sequence formed by precoding coefficients of the downstream signals of all the COs, to obtain a downstream precoding signal sequence corresponding to the downstream signal sequence; and send the downstream precoding signal sequence to the joint canceller 82, where the joint canceller 82 is configured to process the downstream precoding signal sequence using a first joint upstream cancellation coefficient sequence, to determine the NEXT signals in the upstream signals of all the COs; and perform NEXT cancellation processing on the first signal sequence using the determined NEXT signals, to obtain a second signal sequence, where the first joint upstream cancellation coefficient sequence is formed by combining an NEXT cancellation coefficient sequence formed by NEXT cancellation coefficients that are used to cancel the NEXT signals in the upstream signals of all the COs and the FEXT cancellation coefficient sequence formed by the FEXT cancellation coefficients that are used to cancel the FEXT signals in the upstream signals of all the COs.

In a second specific implementation manner, the transceiver 81 is configured to receive an upstream signal that is forwarded by each CO and that includes no Echo interfering signal, and form an upstream signal sequence including upstream signals that are of all the COs and that include no Echo interfering signal, where after each CO receives an upstream signal sent by the CPE corresponding to each CO, each CO performs Echo interference cancellation processing on the received upstream signal, to obtain an upstream signal including no Echo interfering signal.

Figure 10:
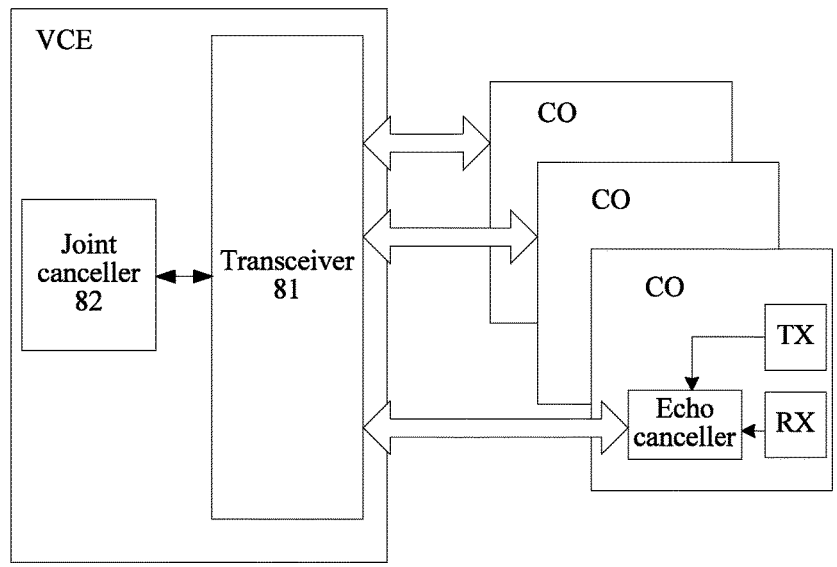
FIG. 10 is a schematic structural diagram of a fourth VCE according to the present disclosure.

In this manner, referring to FIG. 10, each CO includes an Echo canceller configured to perform Echo interference cancellation processing on the received upstream signal, to obtain an upstream signal including no Echo interfering signal.

In this manner, the joint canceller 82 is configured to process the downstream signal sequence using a second joint upstream cancellation coefficient sequence, to determine the NEXT signals in the upstream signals of all the COs, and perform NEXT cancellation processing on the first signal sequence using the determined NEXT signals, to obtain a second signal sequence, where the second joint upstream cancellation coefficient sequence is formed by combining an NEXT cancellation coefficient sequence formed by NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and a precoding coefficient sequence formed by precoding coefficients that correspond to the downstream signals of all the COs.

In a third specific implementation manner, the transceiver 81 is configured to receive the upstream signal that is sent by the CPE corresponding to each CO and that is received and forwarded by the CO, and form the upstream signal sequence including the upstream signals of all the COs.

In this manner, the joint canceller 82 is configured to process the downstream signal sequence using a third joint upstream cancellation coefficient sequence, to determine the NEXT signals and Echo interfering signals in the upstream signals of all the COs, where the third joint upstream cancellation coefficient sequence is formed by combining an Echo cancellation coefficient sequence formed by Echo cancellation coefficients that are used to cancel the Echo interfering signals in the upstream signals of all the COs, an NEXT cancellation coefficient sequence formed by NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and a precoding coefficient sequence formed by precoding coefficients that correspond to the downstream signals of all the COs.

Based on any one of the foregoing embodiments, the transceiver 81 is further configured to obtain an upstream pilot signal that is sent by each CPE according to a specified period to a CO corresponding to the CPE and that is used to update a joint upstream cancellation coefficient sequence, form a first upstream pilot signal sequence, obtain a downstream pilot signal that is sent by each CO according to the period to CPE corresponding to the CO and that is used to update the joint upstream cancellation coefficient sequence, and form a downstream pilot signal sequence; and the joint canceller 82 is further configured to perform cancellation processing on an FEXT signal in the first upstream pilot signal sequence using the FEXT cancellation coefficient sequence, to obtain a second upstream pilot signal sequence, and process the downstream pilot signal sequence using a currently-used joint upstream cancellation coefficient sequence, to determine NEXT signals in upstream pilot signals; and perform NEXT cancellation processing on the second upstream pilot signal sequence using the determined NEXT signals, to obtain a third upstream pilot signal sequence; determine a variation of the joint upstream cancellation coefficient sequence according to the third upstream pilot signal sequence and a preconfigured fourth upstream pilot signal sequence that is formed by upstream pilot signals including no interfering signal; and update, according to the determined variation, the currently-used joint upstream cancellation coefficient sequence, where the joint upstream cancellation coefficient sequence is the first joint upstream cancellation coefficient sequence, the second joint upstream cancellation coefficient sequence, or the third joint upstream cancellation coefficient sequence.

Figure 11:
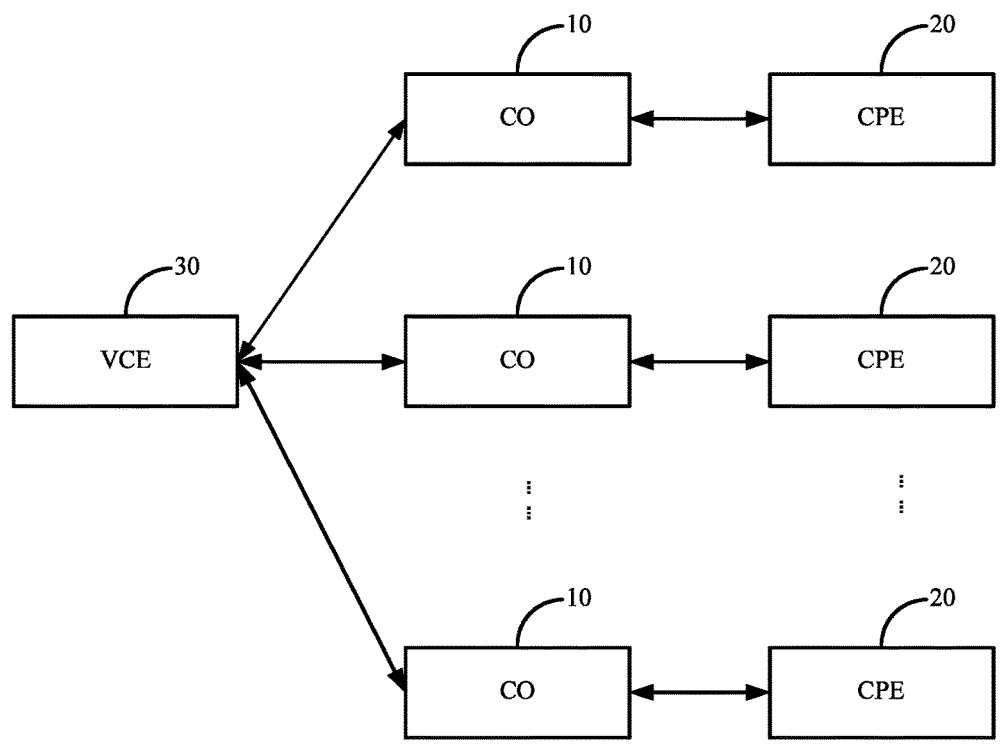
FIG. 11 is a schematic structural diagram of a DSL system according to the present disclosure.

Based on the same inventive idea, referring to FIG. 11, the present disclosure further provides a DSL system, where the DSL system includes multiple DSL lines, each DSL line is connected to one CO 10 and one CPE 20, and the DSL system further includes a VCE 30 that separately communicates with the CO 10 and the CPE 20, where the CO 10 is configured to receive an upstream signal sent by CPE corresponding to the CO; send a downstream signal to the CPE corresponding to the CO; send the received upstream signal and the sent downstream signal to the VCE; and receive an upstream signal that is returned by the VCE and that includes no interfering signal; the CPE 20 is configured to send an upstream signal to a CO corresponding to the CPE; and the VCE 30 is configured to obtain an upstream signal that is sent by CPE corresponding to each CO and that is received by the CO, form an upstream signal sequence including upstream signals of all COs, obtain a downstream signal that is sent by each CO to the CPE corresponding to each CO, and form a downstream signal sequence including downstream signals of all the COs; perform FEXT cancellation processing on the upstream signal sequence using an FEXT cancellation coefficient sequence formed by FEXT cancellation coefficients that are used to cancel far-end crosstalk FEXT signals in the upstream signals of all the COs, to obtain a first signal sequence, and process the downstream signal sequence using a preconfigured joint upstream cancellation coefficient sequence, to determine near-end crosstalk NEXT signals in the upstream signals of all the COs; and perform NEXT cancellation processing on the first signal sequence using the determined NEXT signals, to obtain a second signal sequence, and send upstream signals in the second signal sequence to all the COs.

During implementation, in a first specific implementation manner, the CO 10 is configured to perform Echo interference cancellation processing on the received upstream signal, to obtain an upstream signal including no Echo interfering signal; and send the upstream signal including no Echo interfering signal to the VCE.

In this manner, the obtaining, by the VCE 30, an upstream signal that is sent by CPE corresponding to each CO 10 and that is received by the CO, and forming an upstream signal sequence including upstream signals of all COs is receiving an upstream signal that is forwarded by each CO and that includes no Echo interfering signal, and forming an upstream signal sequence including upstream signals that are of all the COs and that include no Echo interfering signal.

In this manner, the processing, by the VCE 30, the downstream signal sequence using a preconfigured joint upstream cancellation coefficient sequence, to determine near-end crosstalk NEXT signals in the upstream signals of all the COs is performing precoding processing on the downstream signal sequence according to a precoding coefficient sequence formed by precoding coefficients of the downstream signals of all the COs, to obtain a downstream precoding signal sequence corresponding to the downstream signal sequence; and processing the downstream precoding signal sequence using a first joint upstream cancellation coefficient sequence, to determine the NEXT signals in the upstream signals of all the COs, where the first joint upstream cancellation coefficient sequence is formed by combining an NEXT cancellation coefficient sequence formed by NEXT cancellation coefficients that are used to cancel the NEXT signals in the upstream signals of all the COs and the FEXT cancellation coefficient sequence formed by the FEXT cancellation coefficients that are used to cancel the FEXT signals in the upstream signals of all the COs.

In a second specific implementation manner, the CO 10 is configured to perform Echo interference cancellation processing on the received upstream signal, to obtain an upstream signal including no Echo interfering signal; and send the upstream signal including no Echo interfering signal to the VCE.

In this manner, the obtaining, by the VCE 30, an upstream signal that is sent by CPE corresponding to each CO and that is received by the CO, and forming an upstream signal sequence including upstream signals of all COs is receiving an upstream signal that is forwarded by each CO and that includes no Echo interfering signal, and forming an upstream signal sequence including upstream signals that are of all the COs and that include no Echo interfering signal.

In this manner, the processing, by the VCE 30, the downstream signal sequence using a preconfigured joint upstream cancellation coefficient sequence, to determine NEXT signals in the upstream signals of all the COs is processing the downstream signal sequence using a second joint upstream cancellation coefficient sequence, to determine the NEXT signals in the upstream signals of all the COs, where the second joint upstream cancellation coefficient sequence is formed by combining an NEXT cancellation coefficient sequence formed by NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and a precoding coefficient sequence formed by precoding coefficients that correspond to the downstream signals of all the COs.

In a third specific implementation manner, the CO 10 is configured to directly send the received upstream signal to the VCE.

In this manner, the obtaining, by the VCE 30, an upstream signal that is sent by CPE corresponding to each CO and that is received by the CO, and forming an upstream signal sequence including upstream signals of all COs is receiving the upstream signal that is sent by the CPE corresponding to each CO and that is received and forwarded by the CO, and forming the upstream signal sequence including the upstream signals of all the COs.

The processing, by the VCE 30, the downstream signal sequence using a preconfigured joint upstream cancellation coefficient sequence, to determine near-end crosstalk NEXT signals in the upstream signals of all the COs is processing the downstream signal sequence using a third joint upstream cancellation coefficient sequence, to determine the NEXT signals and Echo interfering signals in the upstream signals of all the COs, where the third joint upstream cancellation coefficient sequence is formed by combining an Echo cancellation coefficient sequence formed by Echo cancellation coefficients that are used to cancel the Echo interfering signals in the upstream signals of all the COs, an NEXT cancellation coefficient sequence formed by NEXT cancellation coefficients that are used to cancel the NEXT signals in the upstream signals of all the COs, the FEXT cancellation coefficient sequence formed by the FEXT cancellation coefficients that are used to cancel the FEXT signals in the upstream signals of all the COs, and a precoding coefficient sequence formed by precoding coefficients that correspond to the downstream signals of all the COs.

Based on any one of the foregoing embodiments, the CO 10 is further configured to receive an upstream pilot signal that is sent by corresponding CPE according to a specified period and that is used to update a joint upstream cancellation coefficient sequence, send, according to the period and to the CPE corresponding to the CO, a downstream pilot signal used to update the joint upstream cancellation coefficient sequence, and send the received upstream pilot signal and the sent downstream pilot signal to the VCE; the CPE 20 is further configured to send, according to the specified period and to the corresponding CO, the upstream pilot signal used to update the joint upstream cancellation coefficient sequence; and the VCE 30 is further configured to obtain an upstream pilot signal that is sent by the CPE corresponding to each CO, that is received by the CO, and that is used to update a joint upstream cancellation coefficient sequence, form a first upstream pilot signal sequence, obtain a downstream pilot signal that is sent by each CO according to a period to the CPE corresponding to each CO and that is used to update the joint upstream cancellation coefficient sequence, and form a downstream pilot signal sequence; perform cancellation processing on an FEXT signal in the first upstream pilot signal sequence using the FEXT cancellation coefficient sequence, to obtain a second upstream pilot signal sequence, and process the downstream pilot signal sequence using a currently-used joint upstream cancellation coefficient sequence, to determine NEXT signals in upstream pilot signals; perform NEXT cancellation processing on the second upstream pilot signal sequence using the determined NEXT signals, to obtain a third upstream pilot signal sequence; determine a variation of the joint upstream cancellation coefficient sequence according to the third upstream pilot signal sequence and a preconfigured fourth upstream pilot signal sequence that is formed by upstream pilot signals including no interfering signal; and update, according to the determined variation, the currently-used joint upstream cancellation coefficient sequence, where the joint upstream cancellation coefficient sequence is the first joint upstream cancellation coefficient sequence, the second joint upstream cancellation coefficient sequence, or the third joint upstream cancellation coefficient sequence.

"One embodiment" or "an embodiment" mentioned in the present disclosure means that a particular characteristic, structure, or property related to an embodiment is included in at least one embodiment of the present disclosure. Therefore, "in one embodiment" or "in an embodiment" that appears in this specification does not necessarily refer to a same embodiment. Moreover, the particular characteristic, structure, or property may be combined in one or more embodiments in any proper manner. In addition, processing of specific procedures or steps of manners described in the apparatus embodiments and the system embodiment maintain consistent with those in the method embodiment, and may be combined with each other.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact-disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some specific embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

Persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method for canceling crosstalk between lines in a digital subscriber line (DSL) system, wherein the DSL system comprises multiple DSL lines and each DSL line is connected to one central office (CO) and one customer premises equipment (CPE), the method comprising:
    forming an upstream signal sequence comprising upstream signals sent by a plurality of COs, wherein each upstream signal of the upstream signal sequence is received by a CO from a corresponding CPE of a plurality of CPEs;
    forming a downstream signal sequence comprising downstream signals sent by the plurality of COs to the corresponding plurality of CPEs, wherein each downstream signal of the downstream signal sequence is sent by a CO to a corresponding CPE;
    performing far-end crosstalk (FEXT) cancellation processing on the upstream signal sequence using a FEXT cancellation coefficient sequence in order to obtain a first signal sequence, wherein the FEXT cancellation coefficient sequence is formed by FEXT cancellation coefficients that are used to cancel FEXT signals in the upstream signals of the plurality of COs, and
    processing the downstream signal sequence using a preconfigured joint upstream cancellation coefficient sequence in order to determine near-end crosstalk (NEXT) signals in the upstream signals of the plurality of COs; and
    performing NEXT cancellation processing on the first signal sequence using the determined NEXT signals in order to obtain a second signal sequence, and
    sending upstream signals in the second signal sequence to the plurality of COs.

2. The method according to claim 1, wherein forming the upstream signal sequence comprising the upstream signals sent by the plurality of COs, comprises receiving an upstream signal forwarded by each CO and absent an Echo interfering signal, wherein each CO performs Echo interference cancellation processing on the upstream signal received from a corresponding CPE in order to obtain the upstream signal absent the Echo interfering signal.

3. The method according to claim 2, wherein processing the downstream signal sequence using the preconfigured joint upstream cancellation coefficient sequence in order to determine the NEXT signals in the upstream signals of the plurality of COs, comprises:
    performing precoding processing on the downstream signal sequence according to a precoding coefficient sequence formed by precoding coefficients of the downstream signals of the plurality of COs in order to obtain a downstream precoding signal sequence corresponding to the downstream signal sequence; and
    processing the downstream precoding signal sequence using a first joint upstream cancellation coefficient sequence in order to determine the NEXT signals in the upstream signals of the plurality of COs,
    wherein the first joint upstream cancellation coefficient sequence is formed by combining a NEXT cancellation coefficient sequence formed by NEXT cancellation coefficients that are used to cancel the NEXT signals in the upstream signals of the plurality of COs and the FEXT cancellation coefficient sequence formed by the FEXT cancellation coefficients that are used to cancel the FEXT signals in the upstream signals of the plurality of COs.

4. The method according to claim 2, wherein processing the downstream signal sequence using the preconfigured joint upstream cancellation coefficient sequence in order to determine the NEXT signals in the upstream signals of the plurality of COs comprises processing the downstream signal sequence using a second joint upstream cancellation coefficient sequence in order to determine the NEXT signals in the upstream signals of the plurality of COs, wherein the second joint upstream cancellation coefficient sequence is formed by combining a NEXT cancellation coefficient sequence formed by NEXT cancellation coefficients that are used to cancel the NEXT signals in the upstream signals of the plurality of COs, and wherein the FEXT cancellation coefficient sequence formed by the FEXT cancellation coefficients that are used to cancel the FEXT signals in the upstream signals of the plurality of COs and a precoding coefficient sequence formed by precoding coefficients that correspond to the downstream signals of the plurality of COs.

5. The method according to claim 1, wherein the processing the downstream signal sequence using the preconfigured joint upstream cancellation coefficient sequence, to determine the NEXT signals in the upstream signals of the plurality of COs comprises processing the downstream signal sequence using a third joint upstream cancellation coefficient sequence, to determine the NEXT signals and Echo interfering signals in the upstream signals of the plurality of COs, and wherein the third joint upstream cancellation coefficient sequence is formed by combining an Echo cancellation coefficient sequence formed by Echo cancellation coefficients used to cancel the Echo interfering signals in the upstream signals of the plurality of COs, a NEXT cancellation coefficient sequence formed by NEXT cancellation coefficients used to cancel the NEXT signals in the upstream signals of the plurality of COs, the FEXT cancellation coefficient sequence formed by the FEXT cancellation coefficients used to cancel the FEXT signals in the upstream signals of the plurality of COs and a precoding coefficient sequence formed by precoding coefficients that correspond to the downstream signals of the plurality of COs.

6. The method according to claim 1, further comprising:
obtaining an upstream pilot signal sent by the CPE corresponding to each CO, that is received by the CO, and that is used to update a joint upstream cancellation coefficient sequence;
forming a first upstream pilot signal sequence;
obtaining a downstream pilot signal sent by each CO according to a period to the CPE corresponding to each CO and used to update the joint upstream cancellation coefficient sequence;
forming a downstream pilot signal sequence;
performing cancellation processing on a FEXT signal in the first upstream pilot signal sequence using the FEXT cancellation coefficient sequence in order to obtain a second upstream pilot signal sequence;
processing the downstream pilot signal sequence using a currently-used joint upstream cancellation coefficient sequence in order to determine NEXT signals in upstream pilot signals;
performing NEXT cancellation processing on the second upstream pilot signal sequence using the determined NEXT signals in order to obtain a third upstream pilot signal sequence;
determining a variation of the joint upstream cancellation coefficient sequence according to the third upstream pilot signal sequence and a preconfigured fourth upstream pilot signal sequence that is formed by upstream pilot signals absent an interfering signal; and
updating, according to the determined variation, the currently-used joint upstream cancellation coefficient sequence.

7. The method according to claim 6, wherein the joint upstream cancellation coefficient sequence is one of:
a first joint upstream cancellation coefficient sequence formed by combining a NEXT cancellation coefficient sequence formed by NEXT cancellation coefficients that are used to cancel the NEXT signals in the upstream signals of the plurality of COs and the FEXT cancellation coefficient sequence formed by the FEXT cancellation coefficients that are used to cancel the FEXT signals in the upstream signals of the plurality of COs;
a second joint upstream cancellation coefficient sequence formed by combining the NEXT cancellation coefficient sequence formed by the NEXT cancellation coefficients that are used to cancel the NEXT signals in the upstream signals of the plurality of COs, the FEXT cancellation coefficient sequence formed by the FEXT cancellation coefficients that are used to cancel the FEXT signals in the upstream signals of the plurality of COs, and a precoding coefficient sequence formed by precoding coefficients that correspond to the downstream signals of the plurality of COs; or
a third joint upstream cancellation coefficient sequence formed by combining an Echo cancellation coefficient sequence formed by Echo cancellation coefficients that are used to cancel Echo interfering signals in the upstream signals of the plurality of COs, the NEXT cancellation coefficient sequence formed by the NEXT cancellation coefficients that are used to cancel the NEXT signals in the upstream signals of the plurality of COs, the FEXT cancellation coefficient sequence formed by the FEXT cancellation coefficients that are used to cancel the FEXT signals in the upstream signals of the plurality of COs, and a precoding coefficient sequence formed by precoding coefficients that correspond to the downstream signals of the plurality of COs.

8. A vectoring control entity (VCE) applied in a digital subscriber line (DSL) system, wherein the DSL system comprises multiple DSL lines and each DSL line is connected to one central office (CO) and one customer premises equipment (CPE), and wherein the VCE comprises:
a transceiver configured to:
obtain an upstream signal that is sent by CPE corresponding to each CO and that is received by the CO;
form an upstream signal sequence comprising upstream signals of a plurality of COs;
obtain a downstream signal that is sent by each CO to the CPE corresponding to each CO; and
form a downstream signal sequence comprising downstream signals of the plurality of COs;
a processor configured to:
perform far-end crosstalk (FEXT) cancellation processing on the upstream signal sequence using a FEXT cancellation coefficient sequence formed by FEXT cancellation coefficients that are used to cancel FEXT signals in the upstream signals of the plurality of COs in order to obtain a first signal sequence, and
process the downstream signal sequence using a preconfigured joint upstream cancellation coefficient sequence in order to determine near-end crosstalk (NEXT) signals in the upstream signals of the plurality of COs; and
perform NEXT cancellation processing on the first signal sequence using the determined NEXT signals in order to obtain a second signal sequence, wherein the transceiver sends upstream signals in the second signal sequence to the plurality of COs.

9. The VCE according to claim 8, wherein the transceiver is further configured to:
receive an upstream signal forwarded by each CO and absent an Echo interfering signal; and
form an upstream signal sequence comprising upstream signals that are of the plurality of COs and absent an Echo interfering signal, wherein after each CO receives an upstream signal sent by the CPE corresponding to each CO, each CO performs Echo interference cancellation processing on the received upstream signal in order to obtain an upstream signal absent an Echo interfering signal.

10. The VCE according to claim 9, wherein processing, by the processor, the downstream signal sequence using the preconfigured joint upstream cancellation coefficient sequence in order to determine the NEXT signals in the upstream signals of the plurality of COs comprises:
performing precoding processing on the downstream signal sequence according to a precoding coefficient sequence formed by precoding coefficients of the downstream signals of the plurality of COs in order to obtain a downstream precoding signal sequence corresponding to the downstream signal sequence; and processing the downstream precoding signal sequence using a first joint upstream cancellation coefficient sequence in order to determine the NEXT signals in the upstream signals of the plurality of COs, wherein the first joint upstream cancellation coefficient sequence is formed by combining a NEXT cancellation coefficient sequence formed by NEXT cancellation coefficients that are used to cancel the NEXT signals in the upstream signals of the plurality of COs and the FEXT cancellation coefficient sequence formed by the FEXT cancellation coefficients that are used to cancel the FEXT signals in the upstream signals of the plurality of COs.

11. The VCE according to claim 9, wherein processing, by the processor, the downstream signal sequence using a preconfigured joint upstream cancellation coefficient sequence in order to determine NEXT signals in the upstream signals of the plurality of COs comprises processing the downstream signal sequence using a second joint upstream cancellation coefficient sequence in order to determine the NEXT signals in the upstream signals of the plurality of COs, wherein the second joint upstream cancellation coefficient sequence is formed by combining a NEXT cancellation coefficient sequence formed by NEXT cancellation coefficients that are used to cancel the NEXT signals in the upstream signals of the plurality of COs, the FEXT cancellation coefficient sequence formed by the FEXT cancellation coefficients that are used to cancel the FEXT signals in the upstream signals of the plurality of COs, and a precoding coefficient sequence formed by precoding coefficients that correspond to the downstream signals of the plurality of COs.

12. The VCE according to claim 8, wherein the transceiver is further configured to:
receive the upstream signal sent by the CPE corresponding to each CO and that is received and forwarded by the CO; and
form the upstream signal sequence comprising the upstream signals of the plurality of COs; and
wherein processing, by the processor, the downstream signal sequence using the preconfigured joint upstream cancellation coefficient sequence in order to determine NEXT signals in the upstream signals of the plurality of COs comprises processing the downstream signal sequence using a third joint upstream cancellation coefficient sequence in order to determine the NEXT signals and Echo interfering signals in the upstream signals of the plurality of COs, wherein the third joint upstream cancellation coefficient sequence is formed by combining an Echo cancellation coefficient sequence formed by Echo cancellation coefficients used to cancel the Echo interfering signals in the upstream signals of the plurality of COs, a NEXT cancellation coefficient sequence formed by NEXT cancellation coefficients used to cancel the NEXT signals in the upstream signals of the plurality of COs, the FEXT cancellation coefficient sequence formed by the FEXT cancellation coefficients used to cancel the FEXT signals in the upstream signals of the plurality of COs, and a precoding coefficient sequence formed by precoding coefficients that correspond to the downstream signals of the plurality of COs.

13. The VCE according to claim 8, wherein the transceiver is further configured to:
obtain an upstream pilot signal that is sent by each CPE according to a specified period to a CO corresponding to the CPE and that is used to update a joint upstream cancellation coefficient sequence;
form a first upstream pilot signal sequence;
obtain a downstream pilot signal that is sent by each CO according to the period to CPE corresponding to the CO and that is used to update the joint upstream cancellation coefficient sequence; and
form a downstream pilot signal sequence;
wherein the processor is further configured to:
perform cancellation processing on a FEXT signal in the first upstream pilot signal sequence using the FEXT cancellation coefficient sequence in order to obtain a second upstream pilot signal sequence, and process the downstream pilot signal sequence using a currently-used joint upstream cancellation coefficient sequence in order to determine NEXT signals in upstream pilot signals;
perform NEXT cancellation processing on the second upstream pilot signal sequence using the determined NEXT signals in order to obtain a third upstream pilot signal sequence;
determine a variation of the joint upstream cancellation coefficient sequence according to the third upstream pilot signal sequence and a preconfigured fourth upstream pilot signal sequence that is formed by upstream pilot signals comprising no interfering signal; and
update, according to the determined variation, the currently-used joint upstream cancellation coefficient sequence.

14. The VCE according to claim 13, wherein the joint upstream cancellation coefficient sequence is one of:
a first joint upstream cancellation coefficient sequence formed by combining a NEXT cancellation coefficient sequence formed by NEXT cancellation coefficients that are used to cancel the NEXT signals in the upstream signals of the plurality of COs and a FEXT cancellation coefficient sequence formed by FEXT cancellation coefficients that are used to cancel the FEXT signals in the upstream signals of the plurality of COs; or
a second joint upstream cancellation coefficient sequence formed by combining the NEXT cancellation coefficient sequence formed by the NEXT cancellation coefficients that are used to cancel the NEXT signals in the upstream signals of the plurality of COs, the FEXT cancellation coefficient sequence formed by the FEXT cancellation coefficients that are used to cancel the FEXT signals in the upstream signals of the plurality of COs, and a precoding coefficient sequence formed by precoding coefficients that correspond to the downstream signals of the plurality of COs; or
a third joint upstream cancellation coefficient sequence formed by combining an Echo cancellation coefficient sequence formed by Echo cancellation coefficients that are used to cancel Echo interfering signals in the upstream signals of the plurality of COs, the NEXT cancellation coefficient sequence formed by the NEXT cancellation coefficients that are used to cancel the NEXT signals in the upstream signals of the plurality of COs, the FEXT cancellation coefficient sequence formed by the FEXT cancellation coefficients that are used to cancel the FEXT signals in the upstream signals of the plurality of COs, and the precoding coefficient sequence formed by the precoding coefficients that correspond to the downstream signals of the plurality of COs.

15. A digital subscriber line (DSL) system comprising:
multiple DSL lines, wherein each DSL line of the multiple DSL lines is connected to one central office (CO) and one customer premises equipment (CPE); and
a vectoring control entity (VCE) that separately communicates with the CO and the CPE,
wherein the CO is configured to:
  receive an upstream signal sent by CPE corresponding to the CO;
  send a downstream signal to the CPE corresponding to the CO;
  send the received upstream signal and the sent downstream signal to the VCE; and
  receive an upstream signal that is returned by the VCE and that is absent an interfering signal,
wherein the CPE is configured to send an upstream signal to a CO corresponding to the CPE, and
wherein the VCE is configured to:
  obtain an upstream signal that is sent by CPE corresponding to each CO and that is received by the CO;
  form an upstream signal sequence comprising upstream signals of a plurality of COs;
  obtain a downstream signal that is sent by each CO to the CPE corresponding to each CO;
  form a downstream signal sequence comprising downstream signals of the plurality of COs;
  perform far-end crosstalk (FEXT) cancellation processing on the upstream signal sequence using a FEXT cancellation coefficient sequence formed by FEXT cancellation coefficients that are used to cancel FEXT signals in the upstream signals of the plurality of COs in order to obtain a first signal sequence;
  process the downstream signal sequence using a preconfigured joint upstream cancellation coefficient sequence in order to determine near-end crosstalk (NEXT) signals in the upstream signals of the plurality of COs;
  perform NEXT cancellation processing on the first signal sequence using the determined NEXT signals in order to obtain a second signal sequence; and
  send upstream signals in the second signal sequence to the plurality of COs.

16. The DSL system according to claim 15, wherein the CO is further configured to:
  perform Echo interference cancellation processing on the received upstream signal in order to obtain an upstream signal absent an Echo interfering signal; and
  send the upstream signal comprising no Echo interfering signal to the VCE, and
wherein the VCE is configured to:
  receive an upstream signal forwarded by each CO and that is absent an Echo interfering signal; and
  form an upstream signal sequence comprising upstream signals that are of the plurality of COs and that absent an Echo interfering signal.

17. The DSL system according to claim 16, wherein the VCE is further configured to:
  perform precoding processing on the downstream signal sequence according to a precoding coefficient sequence formed by precoding coefficients of the downstream signals of the plurality of COs in order to obtain a downstream precoding signal sequence corresponding to the downstream signal sequence; and
  process the downstream precoding signal sequence using a first joint upstream cancellation coefficient sequence in order to determine the NEXT signals in the upstream signals of the plurality of COs, wherein the first joint upstream cancellation coefficient sequence is formed by combining a NEXT cancellation coefficient sequence formed by NEXT cancellation coefficients that are used to cancel the NEXT signals in the upstream signals of the plurality of COs and the FEXT cancellation coefficient sequence formed by the FEXT cancellation coefficients that are used to cancel the FEXT signals in the upstream signals of the plurality of COs.

18. The DSL system according to claim 16, wherein the VCE is further configured to process the downstream signal sequence using a second joint upstream cancellation coefficient sequence in order to determine the NEXT signals in the upstream signals of the plurality of COs, wherein the second joint upstream cancellation coefficient sequence is formed by combining a NEXT cancellation coefficient sequence formed by NEXT cancellation coefficients that are used to cancel the NEXT signals in the upstream signals of the plurality of COs, the FEXT cancellation coefficient sequence formed by the FEXT cancellation coefficients that are used to cancel the FEXT signals in the upstream signals of the plurality of COs, and a precoding coefficient sequence formed by precoding coefficients that correspond to the downstream signals of the plurality of COs.

19. The DSL system according to claim 15, wherein the VCE is further configured to process the downstream signal sequence using a third joint upstream cancellation coefficient sequence in order to determine the NEXT signals and Echo interfering signals in the upstream signals of the plurality of COs, wherein the third joint upstream cancellation coefficient sequence is formed by combining an Echo cancellation coefficient sequence formed by Echo cancellation coefficients that are used to cancel the Echo interfering signals in the upstream signals of the plurality of COs, a NEXT cancellation coefficient sequence formed by NEXT cancellation coefficients that are used to cancel the NEXT signals in the upstream signals of the plurality of COs, the FEXT cancellation coefficient sequence formed by the FEXT cancellation coefficients that are used to cancel the FEXT signals in the upstream signals of the plurality of COs, and a precoding coefficient sequence formed by precoding coefficients that correspond to the downstream signals of the plurality of COs.

20. The DSL system according to claim 15, wherein the CO is further configured to:
  receive an upstream pilot signal that is sent by corresponding CPE according to a specified period and that is used to update a joint upstream cancellation coefficient sequence;
  send, according to the period and to the CPE corresponding to the CO, a downstream pilot signal used to update the joint upstream cancellation coefficient sequence; and
  send the received upstream pilot signal and the sent downstream pilot signal to the VCE,
wherein the CPE is further configured to send, according to the specified period and to the corresponding CO, the upstream pilot signal used to update the joint upstream cancellation coefficient sequence, and
wherein the VCE is further configured to:
  obtain an upstream pilot signal that is sent by the CPE corresponding to each CO, that is received by the CO, and that is used to update a joint upstream cancellation coefficient sequence;
  form a first upstream pilot signal sequence;
  obtain a downstream pilot signal sent by each CO according to a period to the CPE corresponding to each CO and that is used to update the joint upstream cancellation coefficient sequence;

form a downstream pilot signal sequence;

perform cancellation processing on a FEXT signal in the first upstream pilot signal sequence using the FEXT cancellation coefficient sequence in order to obtain a second upstream pilot signal sequence;

process the downstream pilot signal sequence using a currently-used joint upstream cancellation coefficient sequence in order to determine NEXT signals in upstream pilot signals;

perform NEXT cancellation processing on the second upstream pilot signal sequence using the determined NEXT signals in order to obtain a third upstream pilot signal sequence;

determine a variation of the joint upstream cancellation coefficient sequence according to the third upstream pilot signal sequence and a preconfigured fourth upstream pilot signal sequence that is formed by upstream pilot signals comprising no interfering signal; and update, according to the determined variation, the currently-used joint upstream cancellation coefficient sequence.

* * * * *